(12) United States Patent
Lee

(10) Patent No.: US 12,503,998 B2
(45) Date of Patent: Dec. 23, 2025

(54) HORIZONTAL AXIS ROTATIONAL FORCE GENERATOR HAVING BLADE REVOLVING AND ROTATING

(71) Applicant: Sang Cheol Lee, Goyang-si (KR)

(72) Inventor: Sang Cheol Lee, Goyang-si (KR)

( * ) Notice: Subject to any disclaimer, the term of this patent is extended or adjusted under 35 U.S.C. 154(b) by 105 days.

(21) Appl. No.: 18/571,308

(22) PCT Filed: Jun. 15, 2022

(86) PCT No.: PCT/KR2022/008476
§ 371 (c)(1),
(2) Date: Dec. 18, 2023

(87) PCT Pub. No.: WO2022/265391
PCT Pub. Date: Dec. 22, 2022

(65) Prior Publication Data
US 2024/0287964 A1    Aug. 29, 2024

(30) Foreign Application Priority Data

Jun. 18, 2021    (KR) .................... 10-2021-0079033

(51) Int. Cl.
*F03D 3/06* (2006.01)
*F03D 3/00* (2006.01)
*F03D 7/02* (2006.01)

(52) U.S. Cl.
CPC ............ *F03D 7/0204* (2013.01); *F03D 3/00* (2013.01); *F03D 3/06* (2013.01); *F05B 2220/30* (2013.01); *F05B 2240/2212* (2013.01)

(58) Field of Classification Search
CPC . F03D 3/002; F03D 3/005; F03D 3/06; F03D 3/062; F03D 7/0204; F05B 2220/30; F05B 2240/2212
See application file for complete search history.

(56) References Cited

U.S. PATENT DOCUMENTS

| 10,378,510 B2 * | 8/2019 | Margolis ................. F03D 3/005 |
| 12,129,827 B2 * | 10/2024 | Buchanan ............... F03D 3/005 |
| 2009/0202346 A1 * | 8/2009 | Baron ..................... F03D 3/068 416/9 |

FOREIGN PATENT DOCUMENTS

| JP | 2003097412 A | 4/2003 |
| KR | 20020021962 A | 3/2002 |

(Continued)

*Primary Examiner* — Sang K Kim
(74) *Attorney, Agent, or Firm* — NKL Law; Jae Youn Kim

(57) ABSTRACT

A horizontal axis rotational force generator is introduced, utilizing fluid flow to drive motion. The system includes one or more rotating mechanisms, each with multiple blades positioned at equal phase angle intervals. These blades revolve around a horizontal shaft while simultaneously rotating around parallel sub-shafts when exposed to fluid pressure, producing torque on the main shaft. A support structure holds the shaft and allows stable axial rotation at designated heights. A gear interlocking unit adjusts angular velocities, shifting blade revolution speeds to half their value in the opposite direction, and transfers the result to the main shaft. As blades pass vertically above the shaft, their orientation is controlled so that surfaces align horizontally or vertically relative to the shaft. This ensures blades consistently generate maximum rotational force on the horizontal plane, efficiently converting fluid flow into usable mechanical energy.

9 Claims, 26 Drawing Sheets

(56) References Cited

FOREIGN PATENT DOCUMENTS

| KR | 20080031764 A | 4/2008 |
|----|---------------|--------|
| KR | 20090102282 A | 9/2009 |
| KR | 100954760 B1 | 4/2010 |
| KR | 20110057301 A | 6/2011 |
| KR | 101080323 B1 | 11/2011 |
| KR | 101525553 B1 | 6/2015 |
| KR | 101849052 B1 | 4/2018 |
| KR | 20210046837 A | 4/2021 |

* cited by examiner

--Prior Art--

--Prior Art--

--Prior Art--

--Prior Art--

HORIZONTAL AXIS ROTATIONAL FORCE GENERATOR HAVING BLADE REVOLVING AND ROTATING

TECHNICAL FIELD

The present invention relates to a rotational force generator that is capable of allowing a plurality of blades revolving and rotating around a blade revolution shaft extending horizontally, when a pressure caused by the flow of a fluid is applied to the blades, to provide the rotational forces generated therefrom to the blade revolution shaft.

More specifically, the present invention relates to a rotational force generator that is capable of allowing a blade revolution shaft to automatically move toward a position and a direction where the rotational forces generated therein are maximized, even if the flow directions of a fluid are changed frequently and no separate direction control power device exists, and allowing rotation phase angles according to revolution phases of blades to be set toward a direction where the rotational forces produced by the flow of the fluid are maximized.

In this way, the present invention seeks to provide the horizontal axis rotational force generator,
which has a plurality of revolving and rotating blades that are characterized in that even though the blades are located at any revolution phases, they provide the rotational forces produced to the maximum according to revolution phase to the blade revolution shaft always in the same rotational direction.

BACKGROUND ART

A rotational force generator, which is configured to have blades moving by the pressure of a fluid flowing to provide their rotational forces to their rotating shafts, is classified into a horizontal axis rotational force generator in which an axis of rotation of each blade is parallel to the flow direction of the fluid and a vertical axis rotational force generator in which the axis of rotation of each blade is perpendicular to the flow direction of the fluid. The two types of rotational force generators have the following advantages and disadvantages.

The horizontal axis rotational force generator is advantageous to be large in scale, but since the moving directions of the blades are perpendicular to the moving direction of the fluid, friction, vibrations, noise, and energy loss may be greatly generated among rotating members and supporting members. As a result, the horizontal axis rotational force generator needs fast wind with a speed of 6 m/s or more.

The vertical axis rotational force generator has somewhat differences according to the type such as the Darrieus wind turbine and the Savonius wind turbine. In this case, forward (+) rotational forces are generated in a 180° phase section where blades move in the flow direction of the fluid among the entire 360° phase section, but backward (−) rotational forces are generated in a 180° phase section where the blades move against the flow of the fluid, so that the efficiency in generating the rotational forces may be lowered. According to a lot of research paper, the Savonius wind turbine has maximum power coefficient less than 20%, and the Darrieus wind turbine has maximum power coefficient less than 30%.

Further, in the case of the vertical axis wind turbines as suggested in conventional patent literatures 1, 2 and 3 as will be mentioned below, since blades rotate at an angular velocity 0.5 times higher than a revolution angular velocity in the opposite direction to their revolutionary motion direction, only if rotation phases according to revolution phases are set to allow, on two points at which the direction of a blade revolution shaft toward blade rotation shafts is perpendicular to the flow direction of the fluid, the vertical direction to the surface of the blade to be vertical to the flow direction of the fluid at one point and to be parallel to the other point, the backward (−) rotational forces are not generated even when the blades are located at any revolution phases, and the flow energy of the fluid is converted into the forward (+) rotational energy of the blades to the maximum.

(Patent literature 1) Korean Patent Application Laid-open No. 10-2009-0102282 (Blade rotation type vertical axis wind turbine)

(Patent literature 2) Korean Patent No. 10-1080323 (Blade direction control device for wind turbine)

(Patent literature 3) Korean Patent No. 10-1525553 (Vertical rotor type wind turbine)

(Patent literature 4) Korean Patent No. 10-0954760 (Windmill for wind turbine)

(Patent literature 5) Korean Patent Application Laid-open No. 10-2021-0046837 (Rotational force generator revolving and rotating according to flow of fluid)

However, in the case of the conventional technology as suggested in the patent literature 1, 2 or 3, a backward rotational torque greater than the rotational torque generated by the pressure applied to the blades in the flow direction of the fluid has to be provided by separate external power, and therefore, the conventional technology may have energy efficiency lower than the existing technologies.

DISCLOSURE

Technical Problem

In the case of the rotational force generators using wind as suggested in the patent literatures 1 to 3, two or more blades revolve around one blade revolution shaft and rotate at an angular velocity 0.5 times higher than a revolution angular velocity in the opposite direction to their revolutionary motion direction, thereby generating the rotational force of the blade revolution shaft.

Under such a principle of the vertical axis wind generator, if it is assumed that the flow direction of a fluid is located at a revolution phase angle of 90°, when a rotation phase angle (a direction of the surface of the blade) at the revolution phase angle of 0° is 0°, a rotational force is maximized, and as the rotation phase angle becomes gradually greater or less than 0°, a rotational force becomes reduced. Further, when the rotation phase angle is +45° (or −45°), the rotational force produced becomes 0 (zero).

However, since all of objects receiving the pressure of a fluid have properties moving in a direction where the areas receiving the pressure are minimized so as to minimize energy loss, unless the movements of the blades are artificially changed through a separate direction control device, blade rotation shafts move in a direction where the rotation phase angles of the blades at the revolution phase angle of 0° are +45° or −45°, and next, the blades are stopped, thereby causing the function of generating the rotational forces to be lost.

To solve such a problem of the rotational force loss, in the case of the patent literature 1, a rudder having the same principle as a wind vane is additionally provided to control the directions of the blades, but the patent literature 1 fails to be patented. In the case of the patent literatures 2 and 3, a wind direction sensor and a separate power generation means are provided to control the directions of the blades, and they are patented.

In the case of the patent literature 1, it is possible to somewhat change the directions of the blades by means of the rudder, but since the changed rotation angle falls far short of 90°, the energy efficiency in generating the rotational forces becomes very low.

However, the energy efficiency in generating the rotational forces in the patent literatures 2 and 3 is bound to be lower than that in the patent literature 1. In this case, even if it is assumed that no energy loss exists, the direction (phase angle) control of the blades is possible only when the force and energy consumed for controlling the directions of the blades through the power generation means are larger than those generated by the rotations and revolutions of the blades, but this violates the first law of thermodynamics (law of conservation of energy).

The present invention is proposed to remove the problems the existing inventions have had, and the present invention relates to a rotational force generator that converts kinetic energy in the flow direction of a fluid into kinetic energy in the revolution directions of blades, like a windmill or water wheel, while having the following advantages.

(1) The rotational force generator of the present invention resists against forces pushed toward rotating shafts and does not have any frictions, noise, vibrations, and energy loss generated among the members rotating, which are disadvantages the existing horizontal axis wind turbine has had.

(2) The rotational force generator of the present invention operates in a similar way to the vertical axis rotational force generator, but only forward (+) rotational forces are produced to the maximum according to revolution phases in the entire revolution section of 360° where the blades revolve around a revolution shaft.

(3) Even though the flow directions of the fluid are changed frequently and a separate rudder or power supply device does not exist, each blade has a surface direction (rotation phase angle) at which the rotational force according to revolution phases is maximized.

(4) Even when the types and flow velocities of fluids are the same, the rotational force generator according to the present invention has the blades capable of generating rotational forces greater than minimum 10% than those as suggested in the patent literatures 1 to 3.

(5) Blades revolve effectively even with low flow velocity and pressure of the fluid, and no additional friction energy loss occurs no matter how much the lengths of the blade revolution arms are increased (6) The rotational force generator according to the present invention is conveniently and aesthetically installed on spare land such as roadsides, railway sides, coasts, etc., or on vertical linear structures such as streetlights or utility poles, and can be used for the efficient generation of new and renewable energy.

As such, the present invention aims to provide a rotational force generator that maximizes the energy efficiency in generating rotational forces using the kinetic energy of fluid flow such as wind power or water power, is safe and practical, and has a high industrial value.

Further, the conventional technology, "Rotational force generator revolving and rotating according to flow of fluid" is filed on Apr. 11, 2021 by the same applicant as the present invention, to solve the problems the existing rotational force generators have had.

The present invention operates in a similar way to the above-mentioned prior art invention as filed by the same applicant as the present invention, but the operating principle thereof is basically different from that of the prior art invention. That is, the present invention provides the following additional solutions as well as the solutions for the above-mentioned six problems the existing rotational force generators have had.

(1) Even though the separate direction control power device the existing inventions have had is not provided or even though two blade revolution shaft rotating mechanisms that are disposed symmetrically in left and right directions the prior art invention as filed by the same applicant as the present invention has had are not provided, only one blade revolution shaft rotating mechanism is provided to obtain the rotation phase angles according to the revolution phases of the blades at which the rotational forces are produced to the maximum.

(2) Since the pressures of the fluid applied to the left and right portions of each blade are the same as each other, only if a given small external force is applied through a rudder or power device, the balanced state is broken to move the blade revolution shaft rotating mechanism in a direction perpendicular to the flow of the fluid, so that the energy produced is maximized, while the energy inputted is little.

(3) In the prior art invention as filed by the same applicant as the present invention, the respective rotational force generators are installed on foundations placed on the ground, but the plurality of horizontal axis rotational force generators according to the present invention hang in a line on a horizontal linear structure such as a long-distance cable or pipe or are stacked vertically, thereby enabling economical installation, without any limitations in installation space.

(4) In the prior art invention as filed by the same applicant as the present invention, the blades revolve around the vertical blade revolution shafts in left and right directions, but according to the present invention, the blades revolve around the horizontal blade revolution shaft in upward and downward directions, so that the horizontal axis rotational force generator according to the present invention has the shape and motion looking like a big bird flapping its wings.

(5) If the horizontal axis rotational force generator according to the present invention as an ultra-large rotational force generator is installed on top of a road, river, sea, mountain, etc., the fast flow velocity generated on the upper part of the generator and the slow flow velocity on the lower part thereof are effectively utilized in producing the rotational force of the blade revolution shaft, while public lands or vacant lands are being effectively used for eco-friendly energy production.

(6) Even if flow velocities and directions are changed frequently, only the phase angles of the blades turning to the left and right on a horizontal plane around the vertically extending center axis are controlled, thereby allowing the rotational velocities of the blades to be easily shifted or controlled.

(7) If the flow velocity is excessively fast due to strong winds or floods, only the directions of the surfaces of the blades turning to the left and right on the horizontal plane are controlled to be parallel to the flow of the fluid, so that the pressure of the fluid applied to the blades is almost 0 (zero), thereby enabling an ultra-large horizontal axis rotational force generator greater than a height 100 m to be installed, without having the risk of collapse and overturning due to the pressure of fluid.

Therefore, the present invention provides the horizontal axis rotational force generator using the flow of the fluid that is economical, high in energy efficiency, very aesthetic, controllable in rotational velocity, and made to an ultra-large size.

Technical Solution

To achieve the objects of the present invention, a horizontal axis rotational force generator using the flow of a fluid may include:
one or more blade revolution shaft rotating mechanisms each having two or more blades spaced apart from one another at the same revolution phase angle intervals in such a way to revolve around a blade revolution shaft extending horizontally and simultaneously rotate around blade rotation shafts parallel to the blade revolution shaft, if a pressure is applied from the flow of the fluid thereto, to apply rotational forces to the blade revolution shaft; a blade revolution shaft rotating mechanism support structure functioning as a shaft support allowing the blade revolution shaft to rotate axially and adapted to supportingly rotate the blade revolution shaft rotating mechanisms to the left and right at given heights; and a revolution and rotation gear shifting interlocker adapted to allow a revolution phase angle and a rotation phase angle of each blade to interlock with each other to maximize the rotational force provided to the blade revolution shaft from the blade,
wherein each blade revolution shaft rotating mechanism includes:
the blade revolution shaft extending horizontally; two or more blade revolution arms extending radially from the center of the blade revolution shaft at the same revolution phase angle intervals as one another; blade rotation shaft supports located on the end portions of the blade revolution arms; the blade rotation shafts coupled rotatable in place to the blade rotation shaft supports in the direction parallel to the blade revolution shaft; and the blades each having two thin curved bodies fixedly coupled to each other in such a way as to be coupled to have line symmetry around the corresponding blade rotation shaft, whereby the revolution angular velocities of the blade revolution arms are shifted and transmitted to the blade rotation shafts by means of the revolution and rotation gear shifting interlocker so that the blade rotation shafts rotate in place at angular velocities 0.5 times higher than the blade revolution arms in the opposite rotational directions to the blade revolution arms, and
the blade revolution shaft rotating mechanism support structure includes:
a blade revolution shaft rotating mechanism rotating shaft extending vertically and functioning as a rotating shaft for supportingly rotating the blade revolution shaft rotating mechanisms to the left and right at the given heights along moving trajectories on a horizontal plane; a blade revolution shaft rotating mechanism rotating shaft stand fixed to a given position to support the blade revolution shaft rotating mechanism rotating shaft; one or more blade revolution shaft rotating mechanism rotating arms coupled rotatable to the left and right to the blade revolution shaft rotating mechanism rotating shaft in such a way as to extend toward the blade revolution shaft; and one or more blade revolution shaft supports located on each blade revolution shaft rotating mechanism rotating arm in such a way as to be fixedly coupled to a blade revolution shaft support gear having the shape of a toothed wheel or planetary gear protruding therefrom toward the axial direction of the blade revolution shaft, the blade revolution shaft support gear serving as a part of the revolution and rotation gear shifting interlocker.

In this case, the revolution and rotation gear shifting interlocker shifts the relative rotation angular velocities of the blade revolution shaft support gears fixed not rotatable to the blade revolution shaft supports to the blades revolving around the blade revolution shaft to angular velocities of 0.5 times higher than the rotation angular velocities and transmits the shifted angular velocities to the blade rotation shafts, and a variety of power transmission means such as spur gears, bevel gears, planetary gears, chain belts, crank mechanisms, and the like, may be used as rotational force transmission parts engaging with the blade revolution shaft support gears.

Further, the turning radius of the blade revolution shaft, which is the horizontal length of the blade revolution shaft rotating mechanism rotating arm, and is the shortest distance between the blade revolution shaft rotating mechanism rotating shaft and the blade revolution shaft, can be greater than or equal to 0 (zero), and if the turning radius of the blade revolution shaft is 0 (zero), a separate wind vane rudder or direction control power device has to be provided to rotate the blade revolution shaft to a direction perpendicular to the flow direction of the fluid. If the turning radius of the blade revolution shaft is greater than 0 (zero), the blades and the blade revolution shaft are pushed against the flow of the fluid and turn to the downward flow, so that since they serve as the wind vane rudder, the blade revolution shaft is naturally oriented to a horizontal direction perpendicular to the flow direction of the fluid.

In this case, even if the flow directions of the fluid are frequently varied and the turning radius of the blade revolution shaft is 0, the sizes of the hydraulic pressures applied to the left and right portions of the blade revolution shaft rotating mechanism are the same as each other, and accordingly, if only a given small external force breaking the balance of the sizes of the left and right hydraulic pressures is applied in any one direction through the wind vane rudder or direction control power device, the blade revolution shaft rotating mechanism rotates to the left and right, thereby allowing the blade revolution shaft to be perpendicular to the flow of fluid very simply and efficiently, without having a large amount of power consumed.

Referring to the relation between the revolution phase angle and the rotation phase angle of each blade, since the blade revolution shaft rotating mechanism rotating shaft extends vertically, if it is assumed that a vertical upward direction is determined as 0 (zero)° that is a reference direction in setting the revolution phase angle and the rotation phase angle of the blade on the vertical plane, the rotation phase angle relation between the blade revolution shaft support gears and the rotational force transmission parts is constantly set to allow the rotation phase angle toward which the surface of the blade is oriented when the revolution phase angle of each blade is 0° to become 0° (in the vertical direction) or 90° (in the horizontal direction), so that even if separate external power is not provided, the rotation phase angle according to the revolution phase angle of the blade, at which the rotational force producible to the maximum using the flow of the fluid is provided to the blade revolution shaft, is obtained very easily and accurately.

Further, the horizontal axis rotational force generator using the flow of the fluid according to the present invention has the following additional solutions.

(1) A plurality of horizontal axis rotational force generators according to the present invention hang on a horizontal linear structure such as a long-distance temporary cable or a stiff pipe built horizontally through their blade revolution shaft rotating mechanism support structures.

If so, the blade revolution shaft rotating mechanism rotating shaft of each horizontal axis rotational force generator extends in a vertical direction perpendicular to the flow direction of the fluid by means of the weight of the blade revolution shaft rotating mechanisms, and the blade revolution shaft and the blade rotation shafts extend in the horizontal direction perpendicular to the flow of the fluid by means of the blade revolution shaft rotating mechanisms or the wind vane rudder pushed against the flow of the fluid toward the most downward flow and turning to the left and right, so that even if the separate direction control power device is not provided, the horizontal axis rotational force generator according to the present invention has a position and a direction on the horizontal plane and rotation phase angles according to the revolution phases of the blades on a vertical plane, at which the rotational forces producible to the maximum by the flow of the fluid are produced. Further, as the flow velocity of the fluid increases, the inclination angle of the blade revolution shaft rotating mechanism rotating shaft inclined by the pressure of the fluid becomes large, so that the rotation phase angles according to the revolution phase angles of the blades become changed, thereby controlling the rotational velocity of each blade within a given range.

(2) The horizontal axis rotational force generator, which has the two blade revolution shaft rotating mechanisms located symmetrically on left and right sides thereof, is made to the shape of a big bird flapping its wing and thus located rotatable to the left and right on the upper portion of a vertical structure such as a streetlight or utility pole.

If so, even though no separate direction control power device is provided, the blade revolution shaft rotating mechanism rotating shaft coupled to the vertical structure extends in the vertical direction perpendicular to the flow direction of the fluid, and the blades and the blade revolution shaft are pushed against the flow of the fluid and turn toward the most downward flow, so that the blade revolution shaft and the blade rotation shafts extend in the horizontal direction perpendicular to the flow of the fluid and each blade has the rotation phase angle according to the revolution phase angle with respect to the vertical direction provided by the vertical structure, at which the rotational force is produced to the maximum.

In this case, it is possible that the left and right blade revolution shaft rotating mechanisms of the horizontal axis rotational force generator share one blade revolution shaft.

(3) Three or more crank mechanisms having the same size are located on the end portions of the blade revolution shaft and the blade rotation shafts of each blade revolution shaft rotating mechanism in such a way as to be spaced apart from one another at the same revolution phase angle intervals and fixedly coupled to the shafts in a line, and blade revolution shaft crank pins and blade rotation shaft crank pins having the same revolution phase are connected rotatable in place to one another by means of radial crank pin connection arms radially extending from the center of the central blade revolution shaft crank pin toward the respective blade rotation shaft crank pins, so that the crank pins interlock with one another to revolve around the respective shafts at the same revolution phase angle and angular velocity.

If the three or more crank pins located on the blade revolution shaft revolve in such a way as to be spaced apart from one another at the same revolution phase angle intervals, the three or more radial crank pin connection arms coupled to the respective crank pins of the blade revolution shaft revolve in such a way as to be spaced apart from one another at the same crank pin revolution phase angle intervals, so that during the revolution process of the three or more radial crank pin connection arms, vibrations, impacts, and power loss caused by eccentric load are not generated.

At least one or more of the three or more radial crank pin connection arms of each blade revolution shaft transmit the rotational force of the blade revolution shaft to one blade rotation shaft only through the tensile resistance generated from a material thereof, and the rotational force transmitted through the tensile resistance periodically increases and decreases in the range of 0.5 to 1 times to the maximum according to the revolution phase angles of the crank pins, so that the radial crank pin connection arms can be made of a lightweight and easily bendable material, while having high tensile strength, to a long thin shape, thereby freely increasing the revolution radius of the blade only through the length adjustment of the radial crank pin connection arms, while the number of rotational force transmission parts and the frictional resistance caused thereby are not increased.

Advantageous Effects of the Invention (1) Since the horizontal axis rotational force generator according to the present invention is configured to allow the blade revolution shaft and the blade rotation shafts to be perpendicular to the flow of the fluid, the blades are pushed against the fluid and rotate, while not pressurizing the shaft supports, and the rotational velocities of the blades become relatively slow to cause no frictions, noise, vibrations, and big energy loss, unlike the horizontal axis (propeller) rotational force generator.

(2) Since only the forward (+) rotational force is generated in the entire revolution section of 360° of each blade, energy production efficiency of the rotational force generator according to the present invention is at least two times higher than that of the exiting vertical axis wind generator where the forward rotational force is generated only in the revolution section of 180° and the backward rotational force is generated in the remaining revolution section of 180°.

(3) Even if the flow directions of the fluid are changed frequently and no additional power is provided, the blade revolution shaft rotating mechanism rotating shaft, which extends vertically, provides a reference direction in setting the phase angle, and accordingly, the blades have the rotation phase angles at which the blade revolution shaft rotational forces producible to the maximum according to the revolution phase angles thereof are produced.

(4) If the turning radius of the blade revolution shaft rotating mechanism is greater than 0, each blade directly serves as a rudder in an efficient manner to allow the blade revolution shaft to extend in the direction perpendicular to the flow of the fluid, even if the flow directions of the fluid are changed frequently and no separate rudder or power is provided, thereby maximizing the rotational force produced therefrom.

(5) In the case where the turning radius of the blade revolution shaft rotating mechanism is 0, if only a given small external force breaking the balance of the left and right hydraulic pressures applied to the blade revolution shaft rotating mechanism is provided, the blade revolution shaft is allowed to be perpendicular to the flow of fluid, without having a large amount of power consumed, to maximize the energy efficiency in producing the rotational force.

(6) Through a technique where a contained angle between the extending direction of the blade revolution shaft and the flow direction of the fluid on the horizontal plane is changed by using a small-scale direction control power device or wind vane rudder, the pressure of the fluid applied to the blade revolution shaft rotating mechanism and the rotational velocity and rotational force size produced thereby are effectively controlled, without having a large amount of external power consumed.

(7) Even though the flow velocity of the fluid is increased excessively due to strong winds or floods, the axial direction of the blade revolution shaft is controlled to be perpendicular to the flow direction of the fluid by means of the small-scale direction control power device or wind vane rudder, and accordingly, the blades do not almost receive the pressure in the flow direction of the fluid, so that even using very small power, the structural stability of the horizontal axis rotational force generator is ensured reliably to prevent the horizontal axis rotational force generator from collapsing or overturning. Therefore, an ultra-large rotational force generator may be installed, without any load of a wind pressure or a hydraulic pressure.

(8) In the case where each blade is not bent on the section perpendicular to the blade rotation shaft and has a plurality of concave and convex portions or protrusions formed on the section parallel to the blade rotation shaft, such a blade increases energy efficiency by more than 10% than a simple flat type blade.

This is because the flow velocity of the fluid colliding against the blade and scattering in every direction becomes decreased, and the flow quantity flowing along the surface of the blade to transmit the momentum to the blade becomes increased. The drag coefficient of the flat type blade is about 1.98, and that of the concave semispherical blade is about 2.3, which shows a difference of 10% or more therebetween.

(9) In the case where the crank mechanisms with the radial crank pin connection arms and the gear shifting planetary gears are used as the revolution and rotation gear shifting interlocker between the blade revolution shaft and the blade rotation shafts, they can produce the rotational forces more effectively than other power transmission parts even though the flow velocity of the fluid is slow.

In this case, even if the lengths of the blade revolution arms extend, the number of rotational force transmission parts is not increased, so that the lengths of moment arms required to increase the rotational force extend, while the power loss caused by the friction of contact surfaces is being not increased.

(10) The separate direction control power device has to be provided in the existing inventions, and two or more blade revolution shaft rotating mechanisms are disposed symmetrically in left and right directions in the prior art invention as filed by the same applicant as the present invention. According to the present invention, however, the direction control function is performed very accurately and with the efficient use of energy by means of only one blade revolution shaft rotating mechanism.

In this case, since the blade revolution shaft extends horizontally, the vertical direction perpendicular to the flow of the fluid is set as a reference direction of the revolution phase angle of the blade, and accordingly, only the rotation phase angle at which the rotational force produced according to the revolution phase angles of the blade is maximized is initially set accurately.

(11) In the prior art invention as filed by the same applicant as the present invention, the foundations for the respective rotational force generators have to be installed, but according to the present invention, a plurality of horizontal axis rotational force generators hang in a line on a horizontal linear structure such as a long-distance temporary cable or a stiff pipe, thereby being installed without any spatial limitations.

In the prior art invention as filed by the same applicant as the present invention, in this case, the direction of gravity is not utilized in setting the revolution phase angle and the rotation phase angle of the blade, so that the rotational force generator is complicated in structure and heavy. According to the present invention, however, only if the horizontal axis rotational force generator hangs on the cable or the like, the direction of gravity is set as a reference direction in setting the phase angle, so that the horizontal axis rotational force generator according to the present invention is simple in structure and greatly reduced in weight. Further, in the case where the horizontal axis rotational force generator according to the present invention is installed on a given place where the flow direction of the fluid is constant, such as river, coast, valley, or space between high rise buildings, the horizontal axis rotational force generator becomes more simplified and economical in its shape and structure.

(12) In the prior art invention as filed by the same applicant as the present invention, the blades revolve to the left and right around the vertical blade revolution shafts, but according to the present invention, the blades revolve up and down around the horizontal blade revolution shaft, so that the horizontal axis rotational force generator according to the present invention has the shape looking like a big flying object flapping its wings. Therefore, if the horizontal axis rotational force generator according to the present invention is installed on a vertical structure such as a streetlight or utility pole or a spare land such as a road, park, dike, and the like, it functions as an aesthetic architecture, while performing energy production.

(13) The revolution distances and weight of the blades around the blade revolution shaft are the same as one another, and the rotational directions and velocities thereof are the same, so that the vibrations, frictions, and inertial resistance caused by the rotations and revolutions of the blades are minimized, thereby making it possible to rotate the blades at high speed and obtaining high energy efficiency in generating the rotational forces.

(14) If the radial crank pin connection arms having the same number as the number of crank mechanism coupling bodies to which the three or more crank mechanisms are coupled interlock with the crank mechanisms, the revolution radius of each blade is freely increased only through the length adjustment of the radial crank pin connection arms, thereby maximizing the energy efficiency and profitability in generating the rotational force.

BRIEF DESCRIPTION OF DRAWINGS

FIGS. 4a, 4b and 4c are exploded views showing the horizontal axis rotational force generator of FIGS. 3a and 3b, wherein FIG. 4a is a front view showing a pipe type blade rotation shaft and a blade, FIG. 4b is a front view showing short circular pipe type blade revolution arms and long circular bar type blade rotation shaft supports, and FIG. 4c is a front view showing blade revolution shaft rotating mechanism rotating arms and a blade revolution shaft support.

MODE FOR INVENTION

Figure 1A:
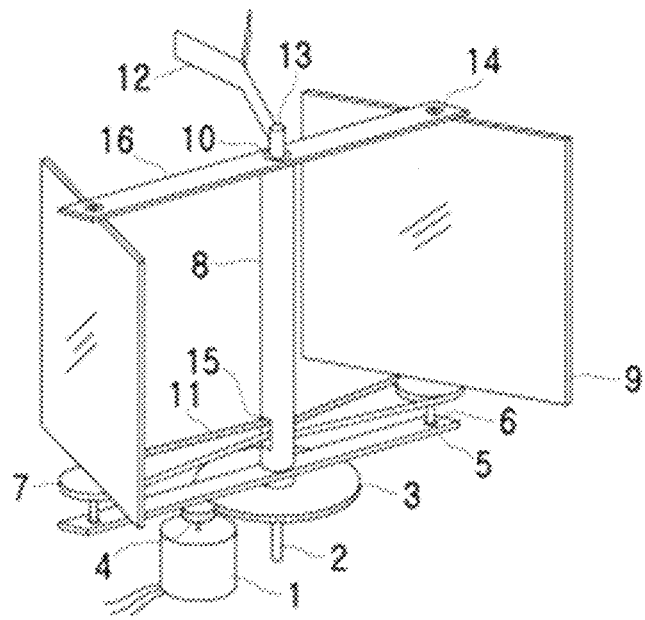
FIG. 1a is a representative figure of patent literature 1.
Figure 1B:
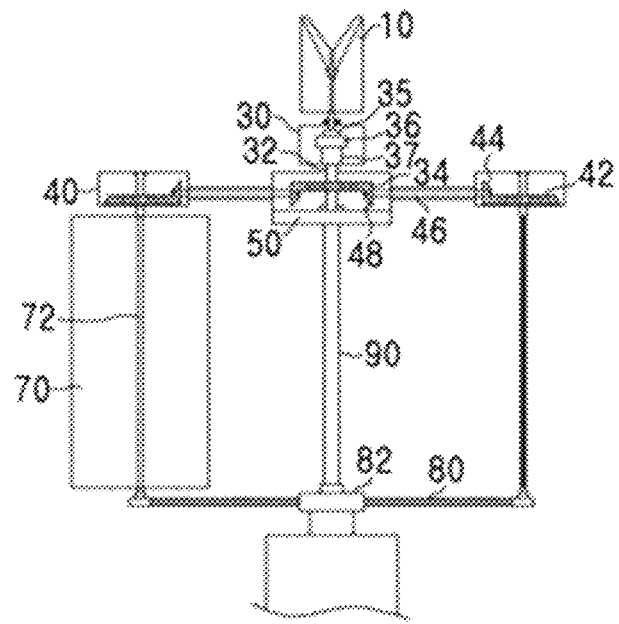
FIG. 1b is a representative figure of patent literature 2.
Figure 1C:
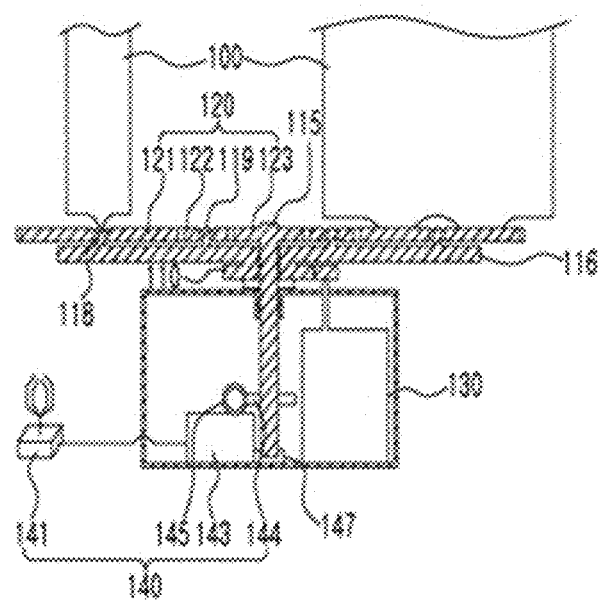
FIG. 1c is a representative figure of patent literature 3.
Figure 1D:
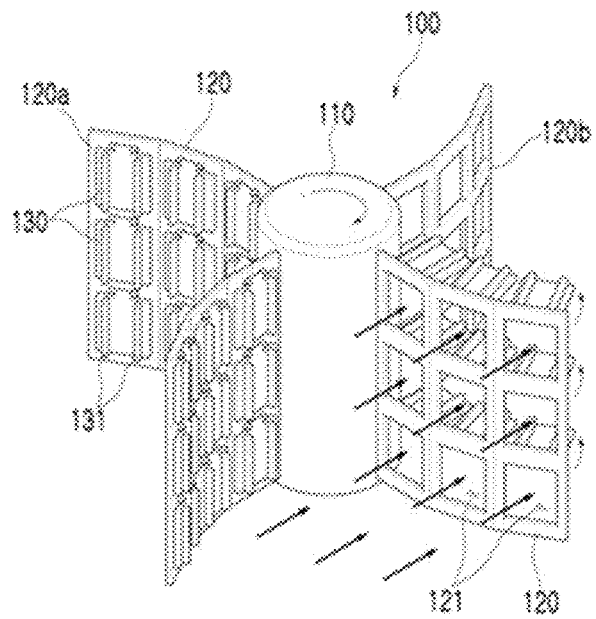
FIG. 1d is a representative figure of patent literature 4.

Hereinafter, the present invention will be explained in detail with reference to the attached drawings. However, for reference numerals, with respect to the same elements, even though they may be displayed in different drawings, such elements use same reference numerals as much as possible, and detailed description on them may be avoided.

As shown in FIGS. 3a, 3b, 7, 8, 12, 15, 18, and 24, a horizontal axis rotational force generator 1 according to the present invention includes: one or more blade revolution shaft rotating mechanisms 2 each having two or more blades 25 spaced apart from one another at the same revolution phase angle intervals to revolve around a blade revolution shaft 21 extending horizontally and simultaneously rotate around blade rotation shafts 24, if a pressure is received from the flow of a fluid thereto, to apply rotational forces to the blade revolution shaft 21;
  a blade revolution shaft rotating mechanism support structure 3 adapted to fixedly support the blade revolution shaft rotating mechanisms 2 against a given point to allow the blade revolution shaft rotating mechanisms 2 to rotate to the left and right around the given point according to the changes in the flow directions of the fluid, while providing a standard in setting the revolution phase angles and the rotation phase angles of the blades 25; and
  a revolution and rotation gear shifting interlocker 4 adapted to interconnect the revolutionary and rotational motions of the blades 25 with each other to allow the rotational forces provided to the blade revolution shaft 21 from the blades 25 by the pressure generated in the flow direction of the fluid to be maximized,
  wherein each blade revolution shaft rotating mechanism 2 includes:
    the blade revolution shaft 21 extending horizontally; a plurality of blade revolution arms 22 extending radially from the blade revolution shaft 21 at the same revolution distance and phase intervals as one another; blade rotation shaft supports 23 located on the end portions of the blade revolution arms 22; the blade rotation shafts 24 rotatably coupled to the blade rotation shaft supports 23 in the directions parallel with the blade revolution shaft 21; the blades 25 each having two thin curved bodies fixedly coupled to each other in such a way as to be coupled to have line symmetry around the corresponding blade rotation shaft; and the revolution and rotation gear shifting interlocker 4 for shifting the revolution angular velocities of the blades 25 and the blade revolution arms 22 and transmitting the shifted revolution angular velocities to the blade rotation shafts 24 so that the blade rotation shafts 24 rotate at angular velocities 0.5 times higher than the blade revolution arms 22 in the opposite directions to the revolution directions of the blades 25, and
  the blade revolution shaft rotating mechanism support structure 3 includes:
  a blade revolution shaft rotating mechanism rotating shaft 31 extending vertically and serving as a rotary shaft for supportingly rotating the blade revolution shaft rotating mechanisms 2 to the left and right along moving trajectories at given heights on the horizontal plane; a blade revolution shaft rotating mechanism rotating shaft stand 34 fixed to a given position to support the blade revolution shaft rotating mechanism rotating shaft 31; one or more blade revolution shaft rotating mechanism rotating arms 32 coupled rotatable to the left and right to the blade revolution shaft rotating mechanism rotating shaft 31 in such a manner as to extend toward the blade revolution shaft 21; one or more blade revolution shaft supports 33 located on each blade revolution shaft rotating mechanism rotating arm 32; and a blade revolution shaft support gear 41, as a part of the revolution and rotation gear shifting interlocker 4, fixedly coupled to the side of each blade revolution shaft support 33 to the shape of a toothed wheel or planetary gear protruding in an axial direction of the blade revolution shaft 21.

In this case, each blade revolution shaft rotating mechanism rotating arm 32 can be divided into a blade revolution shaft rotating mechanism rotating arm stem 321 and one or more blade revolution shaft rotating mechanism rotating arm branches 322 branched from the blade revolution shaft rotating mechanism rotating arm stem 321 to support the blade revolution shaft 21.

Figure 2:
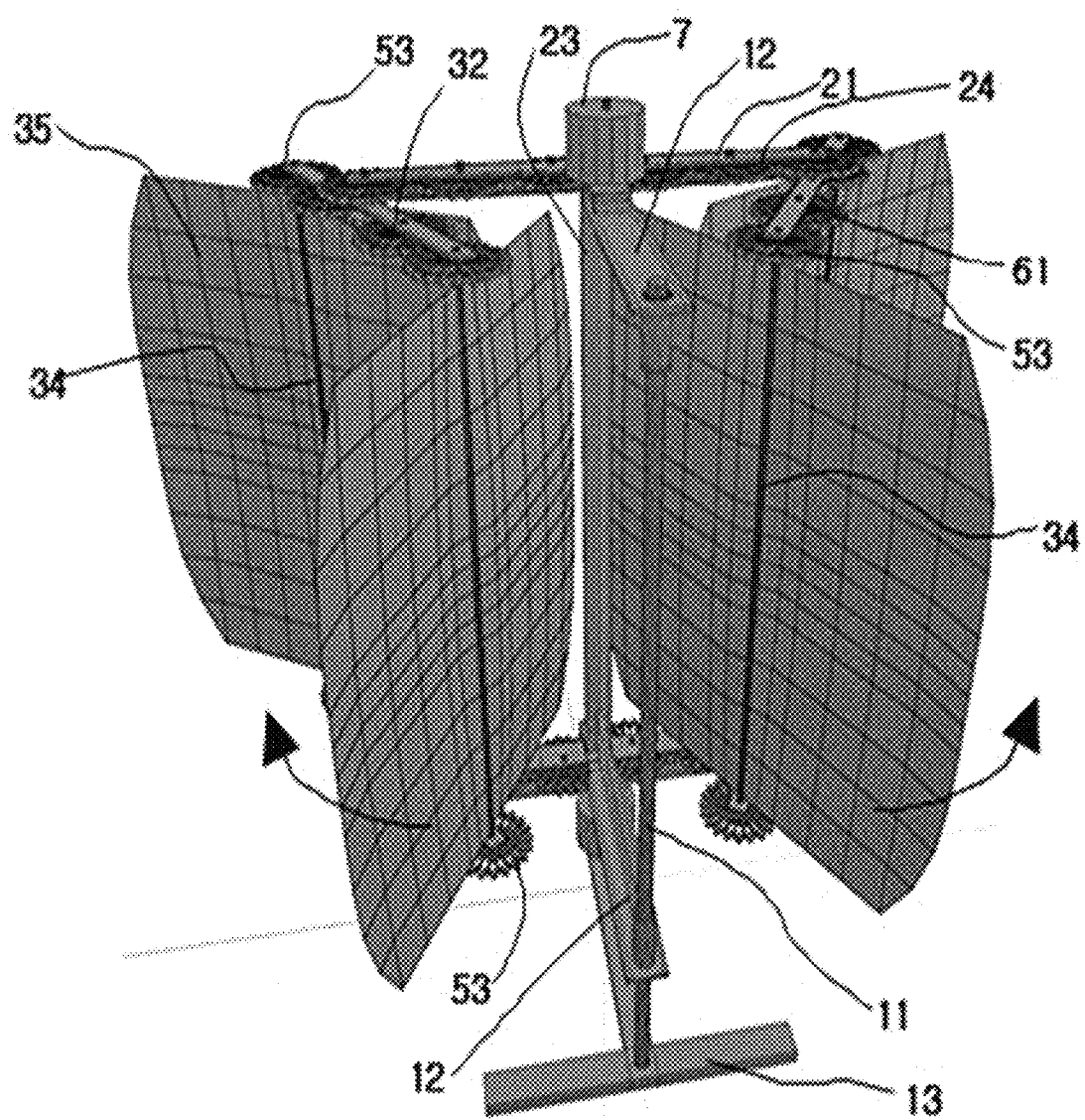
FIG. 2 is a perspective view showing a rotational force generator according to patent literature 5 in which two blade revolution shaft rotating mechanisms each having three blades face each other, while rotational forces are being transmitted through chain belts.
Figure 3A:
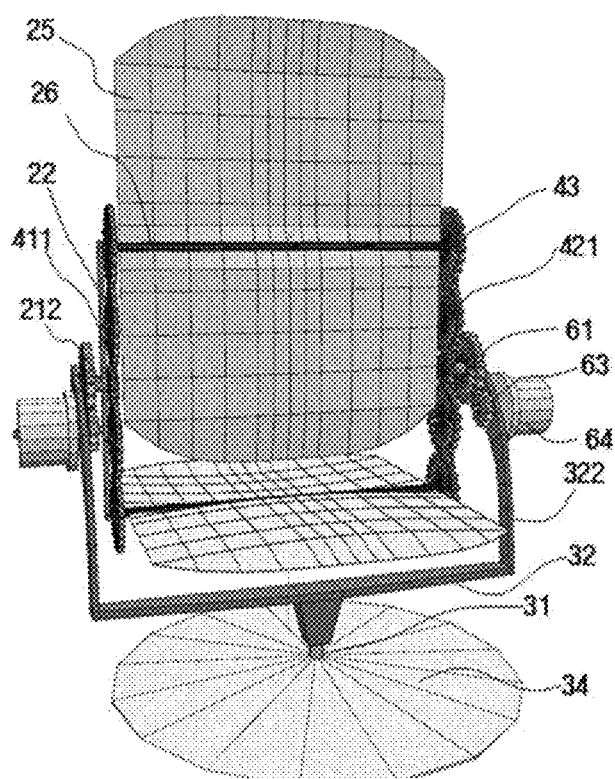
FIG. 3a is a perspective view showing a horizontal axis rotational force generator according to an embodiment of the present invention in which two blades are provided, while rotational forces are being transmitted through a plurality of spur gears.
Figure 3B:
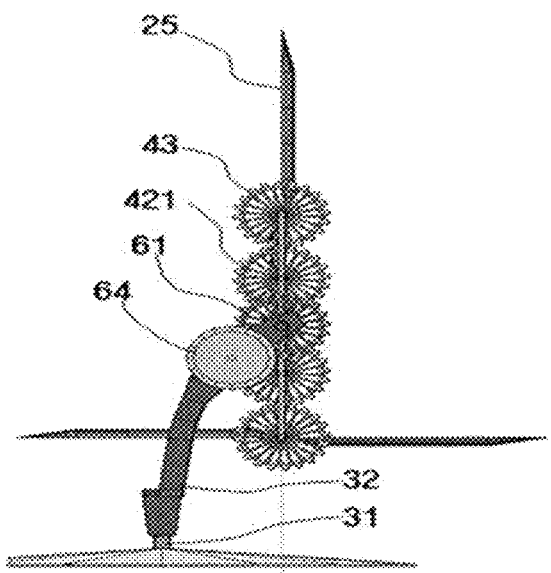
FIG. 3b is a side view showing the horizontal axis rotational force generator according to the embodiment of the present invention.
Figure 7:
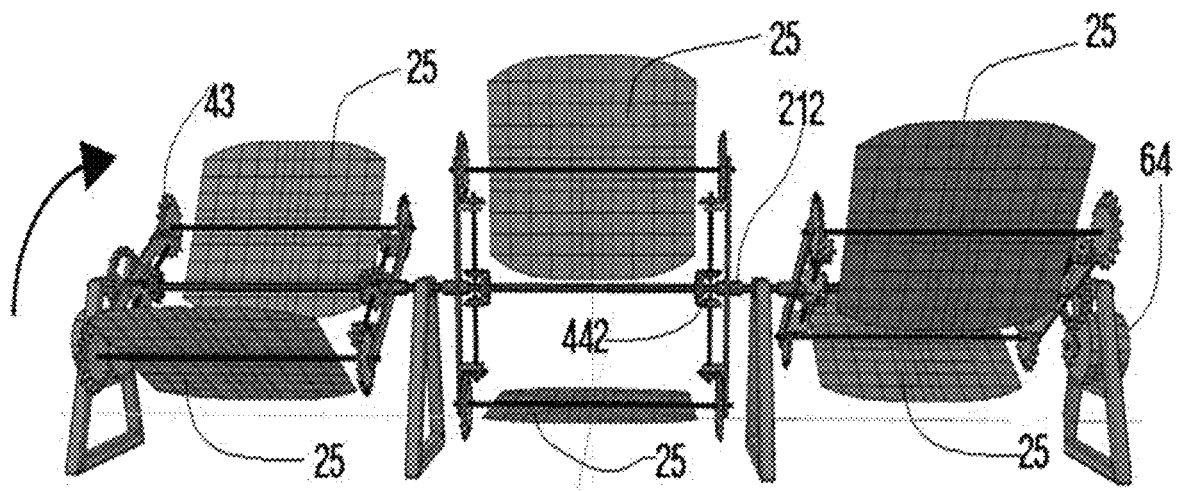
FIG. 7 is a perspective view showing the rotational force generator according to the present invention in which a plurality of blade revolution shaft rotating mechanisms to which rotational forces are transmitted by bevel gears rotate around one blade revolution shaft extending horizontally.
Figure 8:
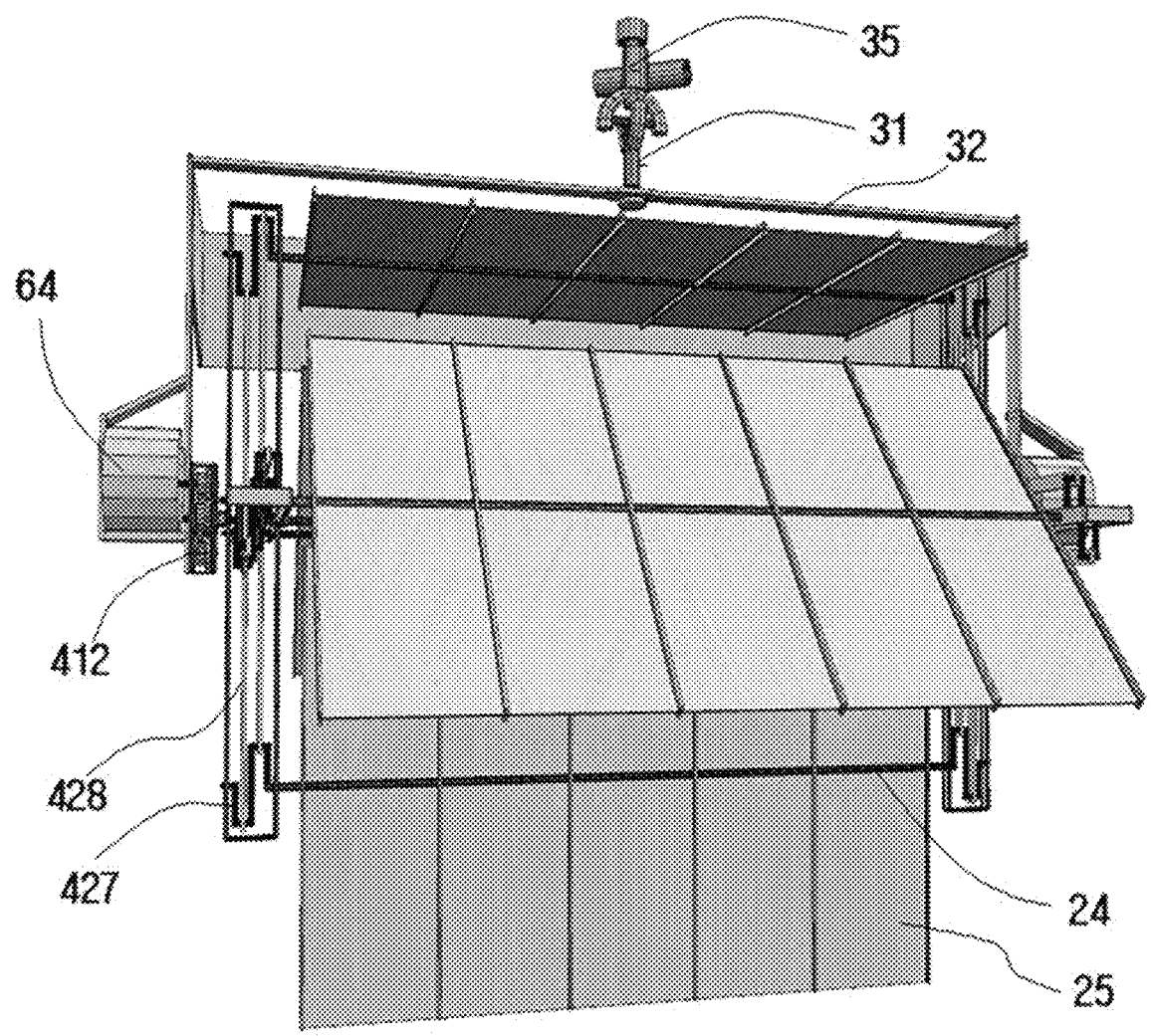
FIG. 8 is a perspective view showing a rotational force generator according to another embodiment of the present invention in which four blades whose revolutionary motions and rotational motions interlock with one another by means of crank mechanisms, revolution shaft support planetary gears, and radial crank pin connection arms.

Further, a variety of power transmission means such as a driven spur gear 421 as shown in FIGS. 3a and 3b, a driven bevel gear 422 as shown in FIG. 7, a crank mechanism 427 as shown in FIG. 8, and a chain belt 425 as shown in FIG. 2 may be used as a rotational force transmission part 42 of the revolution and rotation gear shifting interlocker 4, which engages with or interlocks with the blade revolution shaft support gear 41.

Further, the turning radius of the blade revolution shaft 21, which is the horizontal length of the blade revolution shaft rotating mechanism rotating arm 32, and is the shortest distance between the blade revolution shaft rotating mechanism rotating shaft 31 and the blade revolution shaft 21, can be greater than or equal to 0 (zero), and if the turning radius of the blade revolution shaft 21 is 0 (zero), a separate wind vane rudder 51 or direction control power device 52 has to be provided to rotate the blade revolution shaft 21 to a direction perpendicular to the flow direction of the fluid. If the turning radius of the blade revolution shaft 21 is greater than 0 (zero), the blades 25 are pushed against the flow of the fluid and turn toward the most downward flow, so that even if the wind vane rudder 51 or direction control power device 52 is not provided, the blade revolution shaft 21 naturally moves to the direction perpendicular to the flow direction of the fluid.

In this case, even if the flow directions of the fluid are frequently varied and the turning radius of the blade revolution shaft 21 is 0, the sizes of the hydraulic pressures applied to the left and right portions of the blade revolution shaft rotating mechanism 2 around the blade revolution shaft rotating mechanism rotating shaft 31 are the same as each other, and accordingly, if only a given small external force breaking the balance of the sizes of the left and right hydraulic pressures is applied in any one direction through the wind vane rudder 51 or direction control power device 52, the blade revolution shaft rotating mechanism 2 rotates to the left and right, without having a large amount of power consumed, thereby enabling the blade revolution shaft 21 to be perpendicular to the flow of fluid. Contrarily, according to the existing inventions as suggested in the patent documents 2 and 3, the revolution and rotation phase angles of the blades have to be controlled, and accordingly, the energy consumed for the direction control has to be larger than the energy produced by the revolution and rotation of the blades 25, which causes a fundamental problem.

Since the blade revolution shaft rotating mechanism rotating shaft 31 extends vertically, further, if it is assumed that the vertical direction is determined as 0 (zero)° that is a reference radius in the measurements of the revolution phase angles and the rotation phase angles of the blades 25 and a direction where one side blade surface extends outward from the blade rotation shaft 24 is the rotation phase angle, the rotation phase angle relation between the blade revolution shaft support gear 41 and the rotational force transmission part 42 of the revolution and rotation gear shifting interlocker 4 is constantly set to allow the rotation phase angle to become 0° (in the vertical direction) or 90° (in the horizontal direction) when the revolution phase angle of each blade 25 is 0°, so that even if separate external power is not provided at all, the rotation phase angles optimized according to the revolution phase angles of the blades 25, at which the rotational forces producible to the maximum using the flow of the fluid are provided to the blade revolution shaft 21, are provided very easily and accurately.

Contrarily, the patent literature 1 fails to provide optimal rotation phase angles according to revolution phase angles, the patent literatures 2 and 3 causes the energy loss for the phase angle control of the blades to be larger than the energy produced by the rotation of the blades, and the patent literature 5 as filed by the same applicant as the present invention has the limitations in that when the two or more blade revolution shaft rotating mechanisms 2 have to be located symmetrically on left and right sides, the direction control is possible.

Further, the horizontal axis rotational force generator 1 according to the present invention has the following additional solutions.

Figure 9:
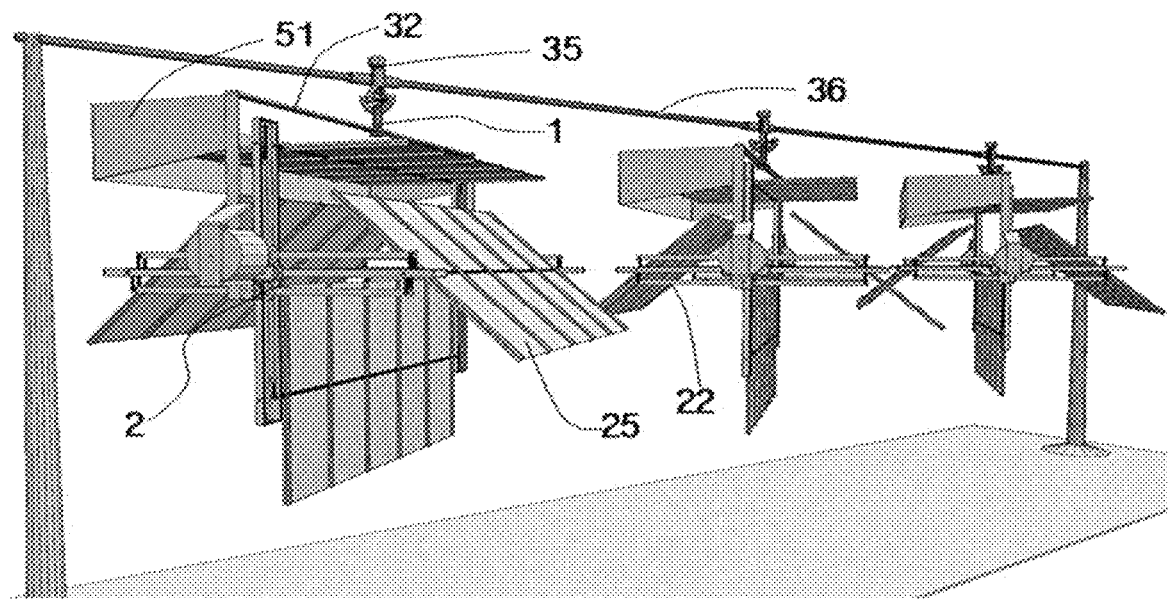
FIG. 9 is a perspective view showing a state wherein a plurality of rotational force generators according to the embodiment of FIG. 8 hang on a cable extending horizontally.
Figure 17:
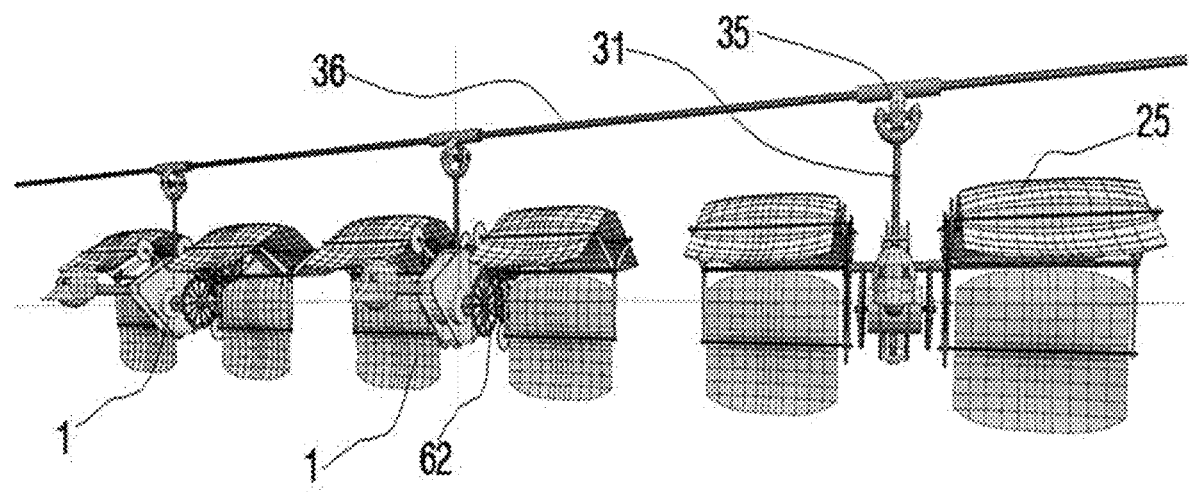
FIG. 17 is a perspective view showing a state wherein a plurality of rotational force generators according to the embodiment of FIG. 15 hang on a cable extending horizontally.

(1) As shown in FIGS. 9 and 17, a plurality of horizontal axis rotational force generators 1 according to the present invention hang rotatable to back and forth and to left and right on a horizontal structure 36 such as a long cable or pipe built horizontally.

If so, the blade revolution shaft rotating mechanism rotating shaft 31 of each horizontal axis rotational force generator 1 extends in a vertical direction perpendicular to the flow direction of the fluid by means of the weight of the horizontal axis rotational force generator 1, and the blade revolution shaft 21 and the blade rotation shafts 24 are pushed against the flow of the fluid and turn to the left and right around the blade revolution shaft rotating mechanism rotating shaft 31 in such a way as to be placed in the horizontal direction perpendicular to the flow of the fluid by means of the wind vane rudder 51 moving toward the most downward flow or the movements of the horizontal axis rotational force generator 1, so that even if a direction control power device 52 and a flow velocity and direction sensing device 53 are not provided, the horizontal axis rotational force generator 1 has the rotation phase angles according to the revolution phase angles of the blades 25 on the vertical plane and the turning phase angles of the blade revolution shaft rotating mechanisms 2 on the horizontal plane, at which the rotational forces producible to the maximum by the flow of the fluid are produced.

In this case, in the embodiment of FIG. 9, the wind vane rudder 51 functions to control the direction of the blade revolution shaft 21 on the horizontal plane, and in the embodiment of FIG. 17, both side blades 25 turning to the left and right around the blade revolution shaft rotating mechanism rotating shaft 31 function to control the direction of the blade revolution shaft 21 on the horizontal plane.

Figure 12:
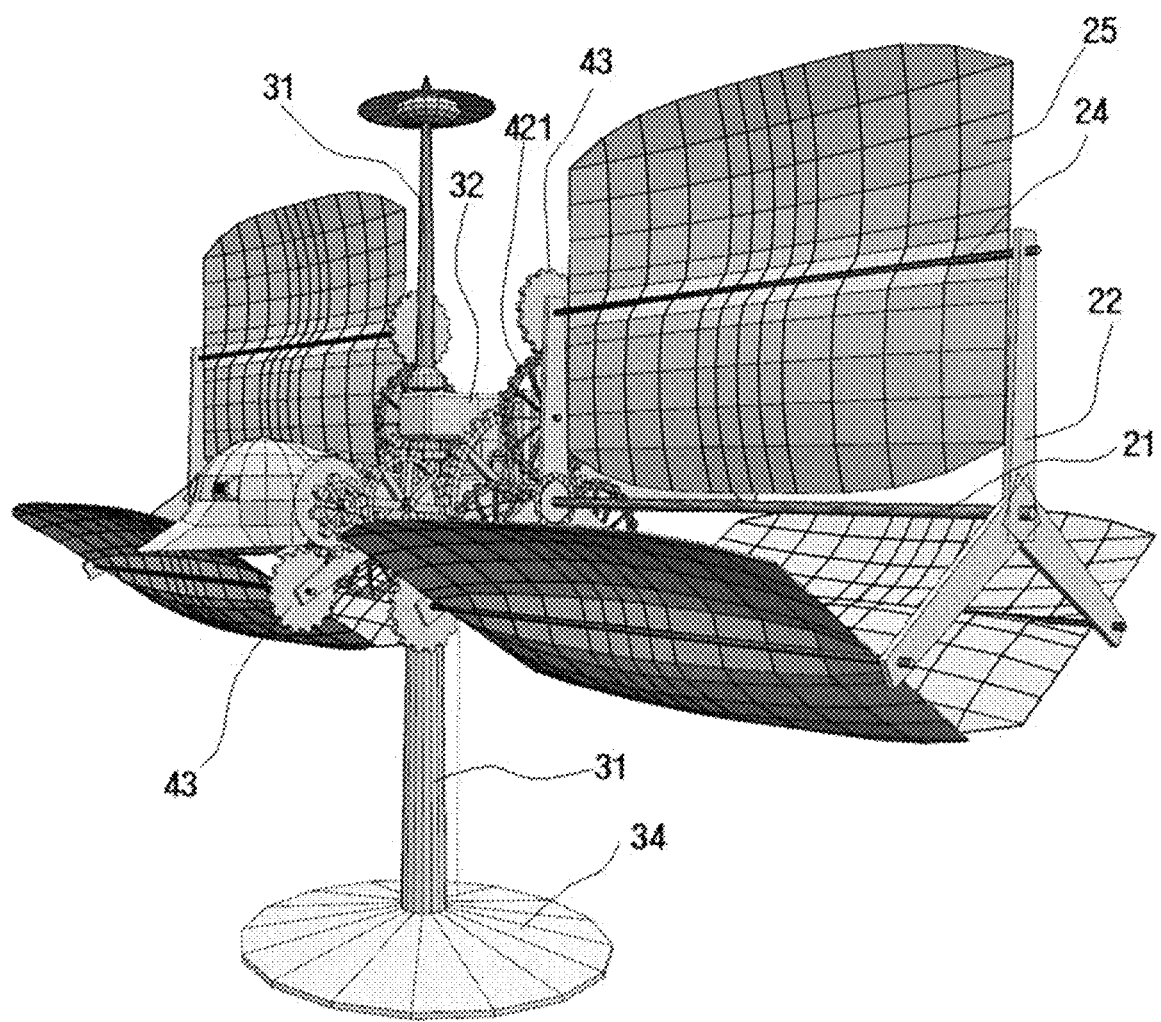
FIG. 12 is a perspective view showing a horizontal axis rotational force generator according to yet another embodiment of the present invention in which two blade revolution shaft rotating mechanisms are located on left and right sides thereof, while having the shape of a bird flapping its wings upward, in such a way as to be coupled rotatable left and right to a streetlight.
Figure 15:
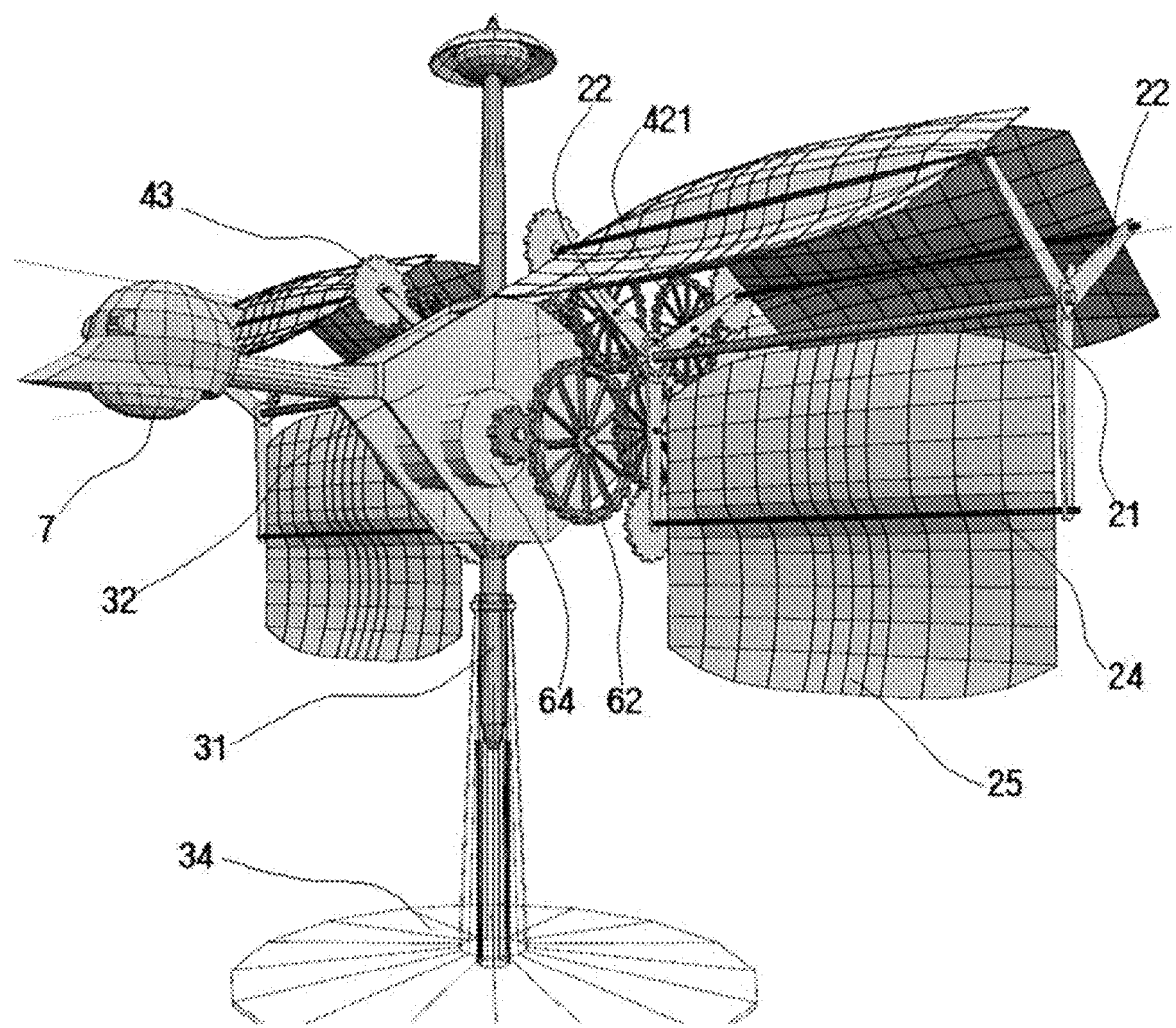
FIG. 15 is a perspective view showing the horizontal axis rotational force generator according to the present invention in which two blade revolution shaft rotating mechanisms are located on left and right sides thereof, while having the shape of a bird flapping its wings downward, in such a way as to be coupled rotatable left and right to a streetlight.

(2) As shown in FIGS. 12 and 15, the horizontal axis rotational force generator 1, which has two blade revolution shaft rotating mechanisms 2 located symmetrically on left and right sides thereof, is made to the shape of a big flying object flapping its wings and thus located rotatable to the left and right on the upper portion of a vertical linear structure such as a streetlight or utility pole.

If so, the horizontal axis rotational force generator 1 having the shape of the flying object flapping its wings has given position and direction and the rotation phase angles according to the revolution phases of the blades, at which the rotational forces producible to the maximum by the flow of the fluid are produced, even if the flows of the fluid are changed frequently and no separate direction control power device is provided.

Figure 13:
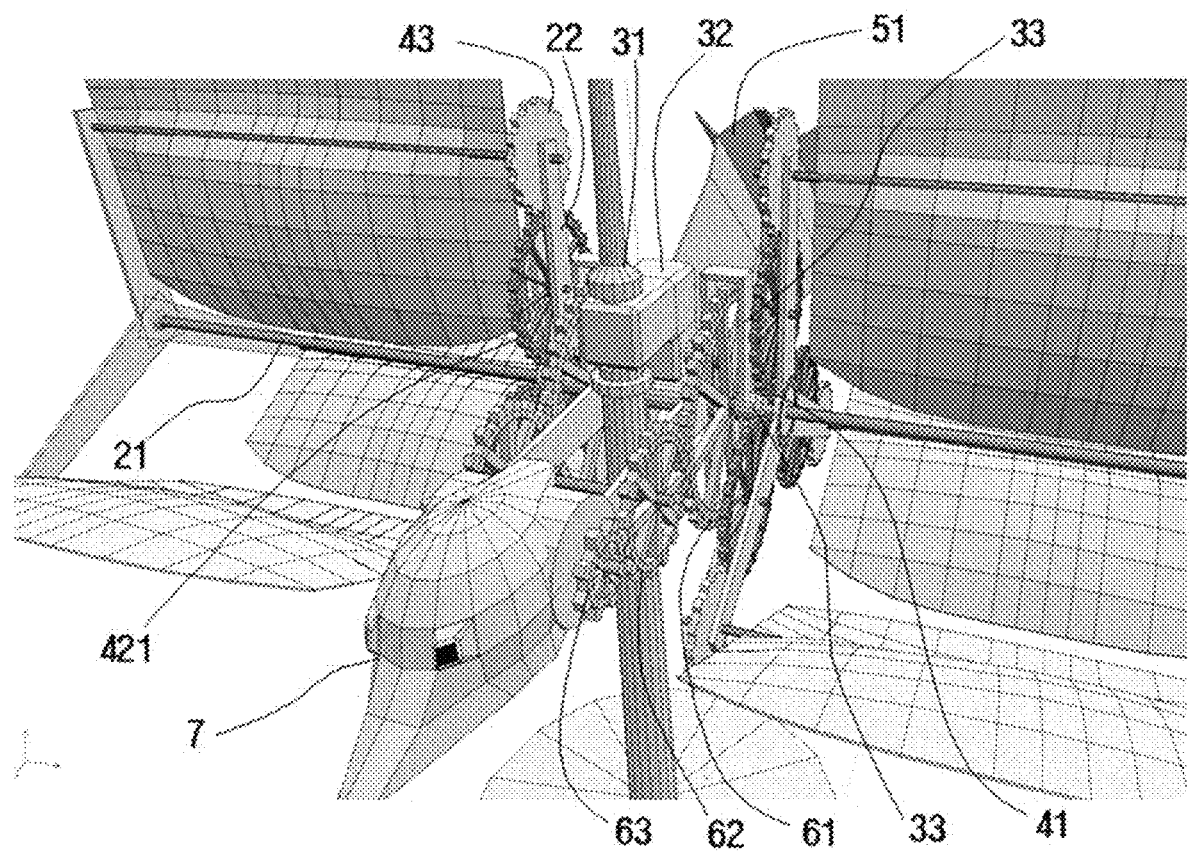
FIG. 13 is an enlarged perspective view showing a mechanical structure of a rotational force transmission portion in the embodiment of FIG. 12.
Figure 14:
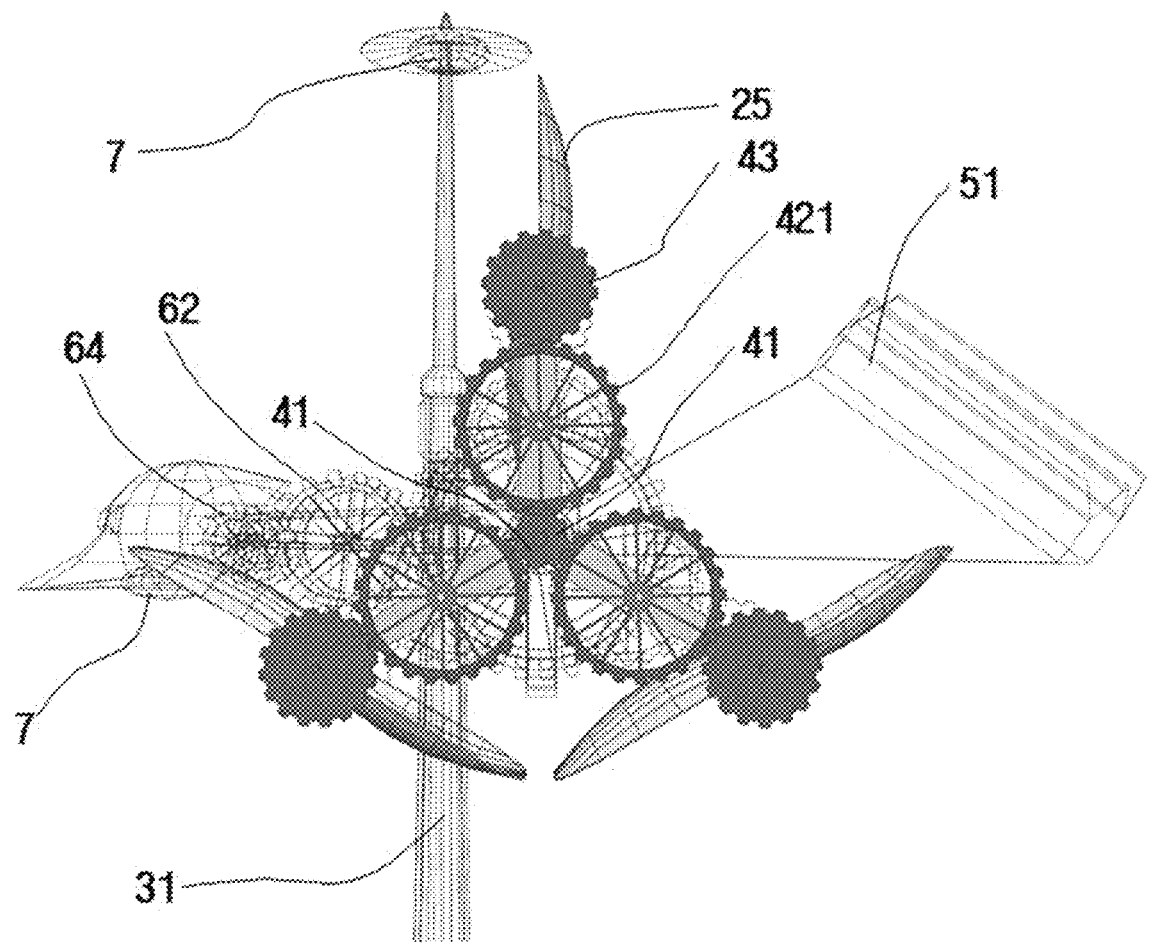
FIG. 14 is a side sectional view showing a revolution and rotation gear shifting interlocker in the embodiment of FIG. 12.
Figure 16:
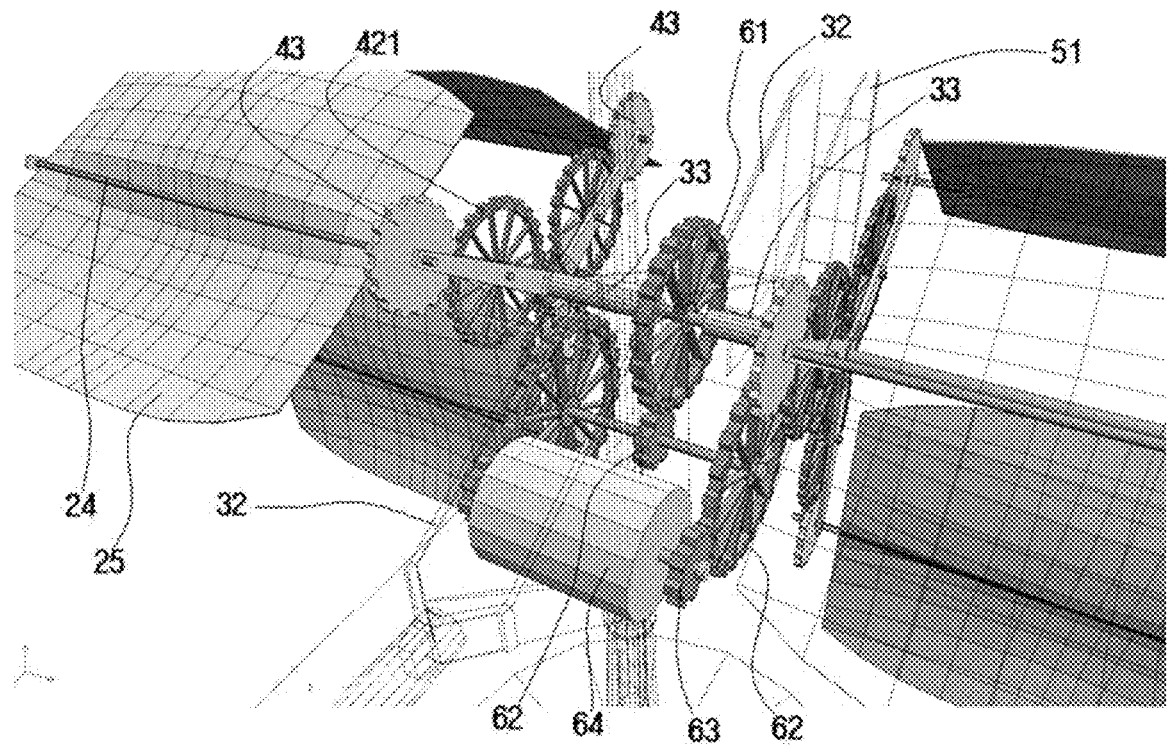
FIG. 16 is an enlarged perspective view showing a mechanical structure of a rotational force transmission portion in the embodiment of FIG. 15.

In this regard, FIG. 13 shows a configuration wherein one blade revolution shaft support 33 is located to fix the blade revolution shaft support gears 41 surroundedly to the outsides of two blade revolution shaft gears 61, and FIG. 16 shows a configuration wherein two blade revolution shaft supports 33 whose outsides are fixed to the blade revolution shaft support gears 41 are located on the left and right sides of one blade revolution shaft gear 61.

Figure 18:
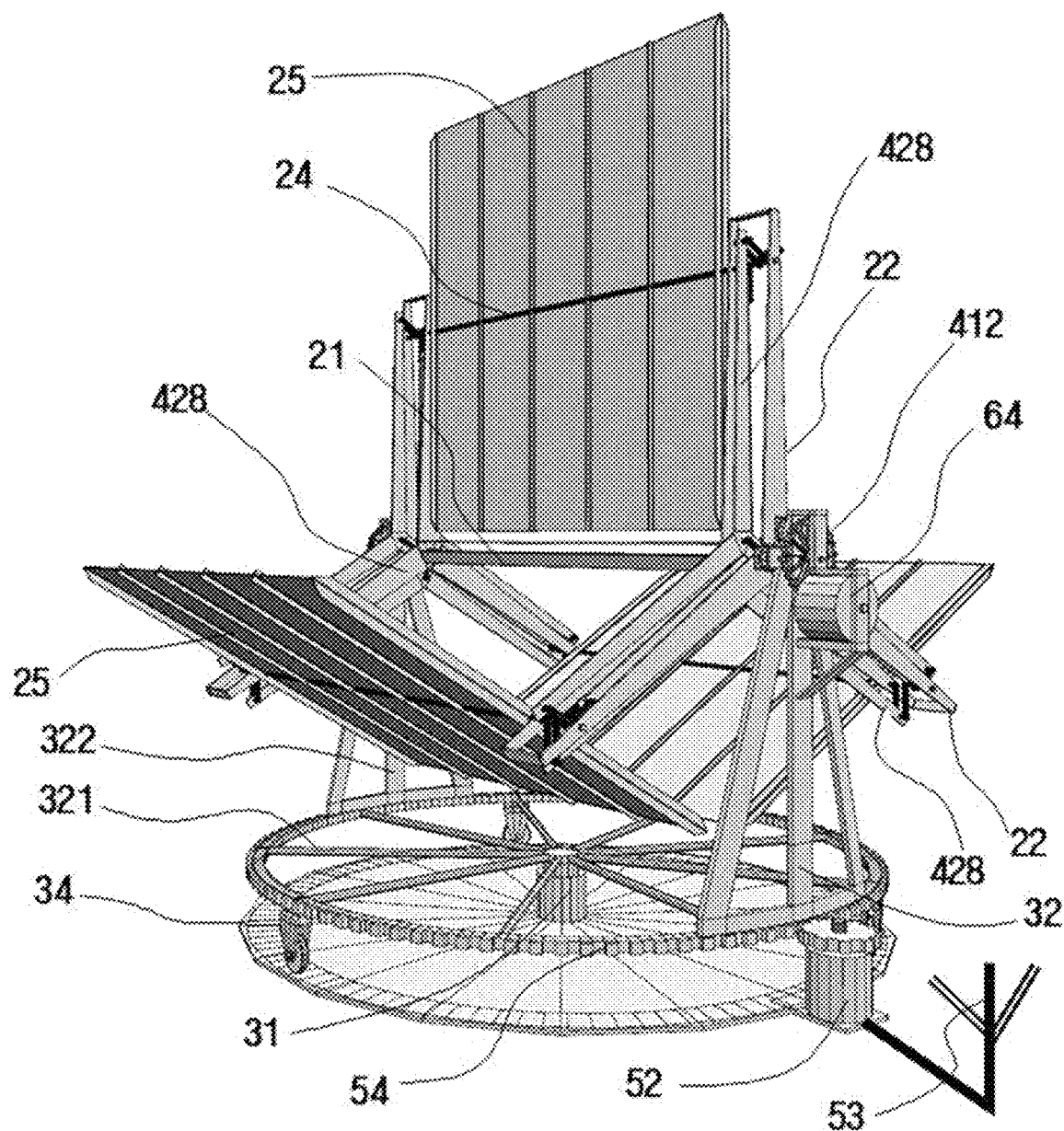
FIG. 18 is a perspective view showing a horizontal axis rotational force generator according to still another embodiment of the present invention in which three blades whose revolutionary motions and rotational motions interlock with one another by means of crank mechanisms, revolution shaft support planetary gears, and radial crank pin connection arms and the direction angles of the blades rotating to the left and right on the horizontal plane are controlled by a direction control power device.
Figure 19:
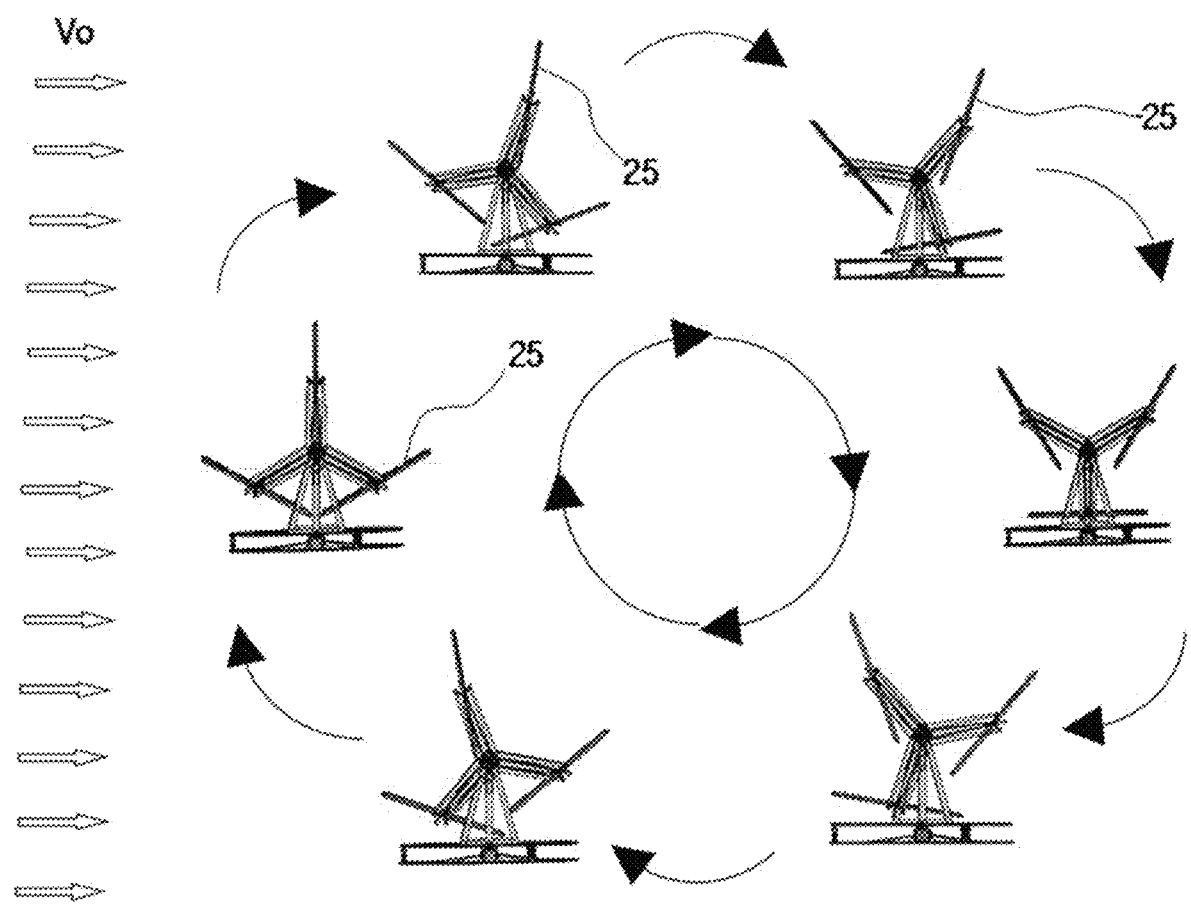
FIG. 19 is a concept view showing the changes in the revolution phase angles and rotation phase angles of the blades are divided into six steps in the embodiment of FIG. 18.
Figure 22A:
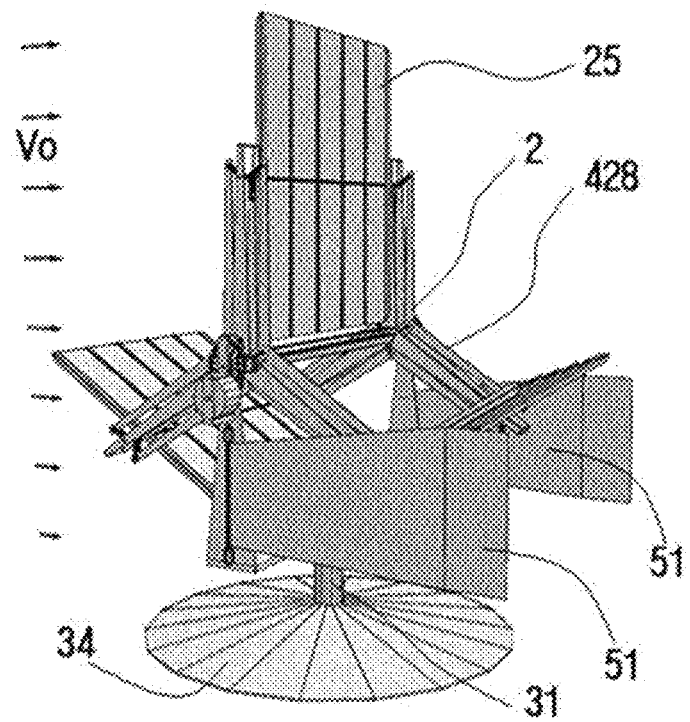
FIG. 22a is a perspective view showing installation directions of wind vane rudders in which the wind vane rudders induce the blades to receive the pressure of the fluid on the front surfaces thereof in a horizontal axis rotational force generator having the same operating principle as shown in FIG. 18.
Figure 22B:
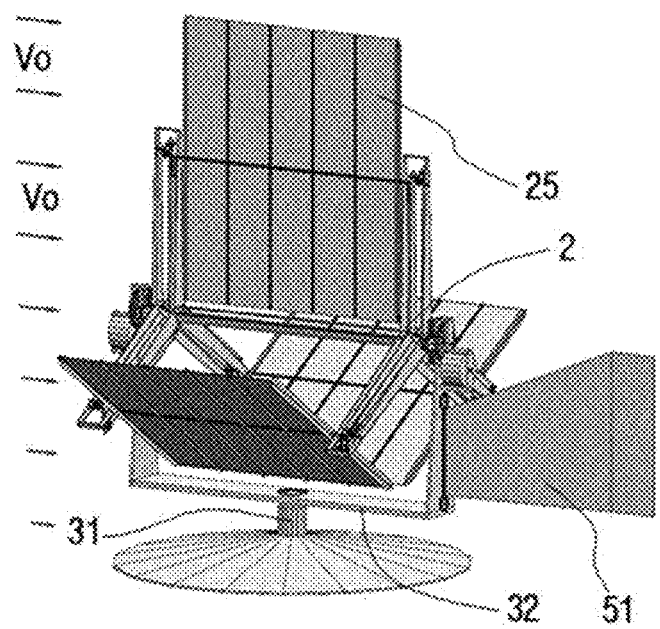
FIG. 22b is a perspective view showing another installation direction of the wind vane rudder in which the wind vane rudder induces the blades to receive the pressure of the fluid on the side surfaces thereof in a horizontal axis rotational force generator having the same operating principle as shown in FIG. 18.

(3) As shown in FIG. 18 or FIGS. 22a and 22b, if the direction control power device 52 or the wind vane rudder 51 is additionally provided to effectively control the left and right rotating angles of the blade revolution shaft 21 on the horizontal plane according to changes of the flow velocity and direction of the fluid, the horizontal axis rotational force generator 1 having an ultra large size of a height 100 m or more is installed, and in this case, the horizontal axis rotational force generator 1 is protected from safety accidents such as collapse or overturning due to the flow of the fluid at a high velocity and a high pressure, such as strong winds or floods. Further, even though the flow velocity of the fluid becomes fast, the revolutionary and rotational velocities of the blades 25 are controllable easily to the optimal velocities.

Figure 20:
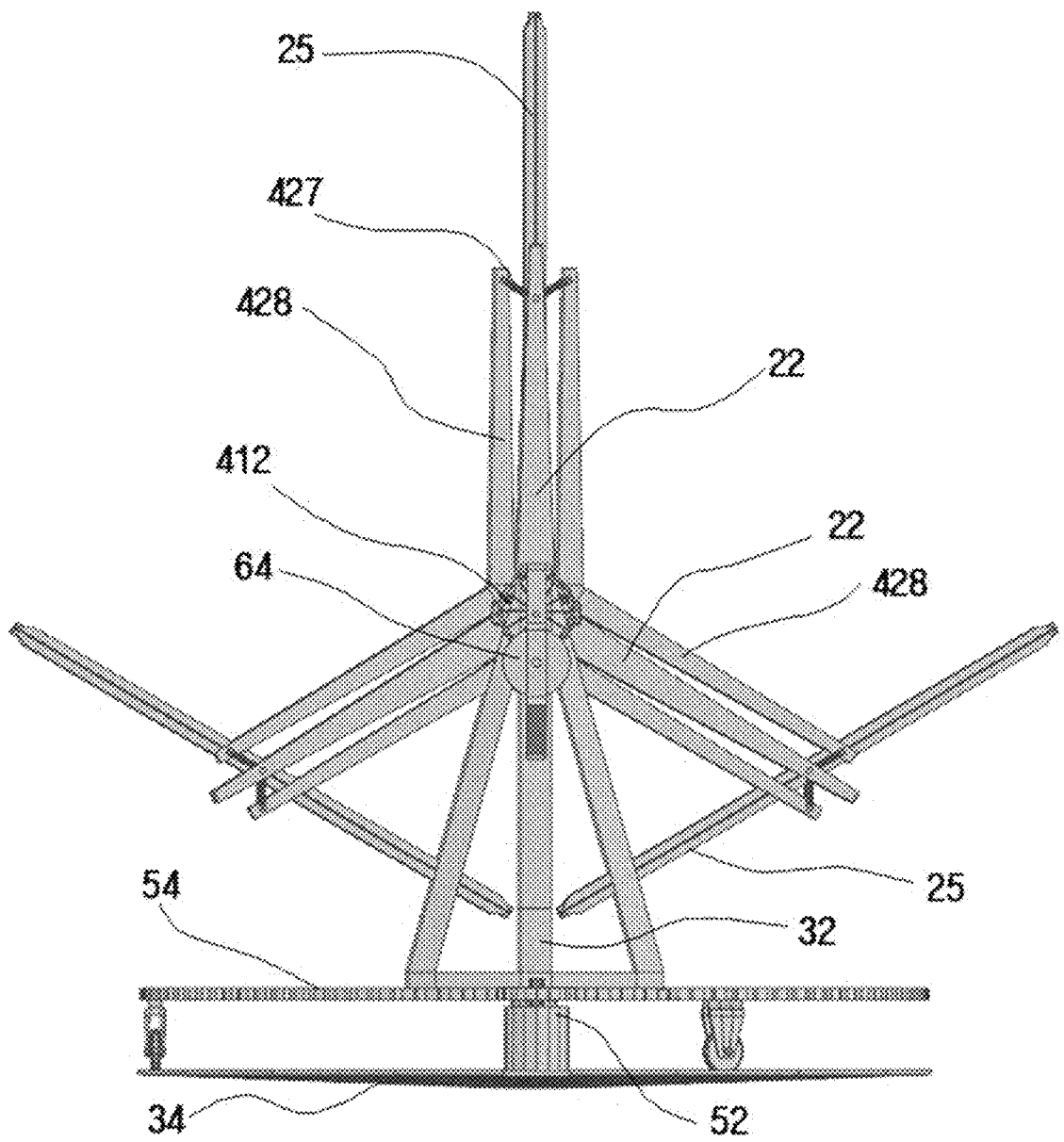
FIG. 20 is a side view showing the horizontal axis rotational force generator according to the embodiment of FIG. 18 that is seen in the flow direction of the fluid, in which the blades are located in directions where the pressure of the fluid is minimized.

If the flow velocity of the fluid is slow, the axial direction of the blade revolution shaft 21 is controlled to the direction perpendicular to the flow direction of the fluid, thereby maximizing the rotational forces produced, and contrarily, if the flow velocity of the fluid is excessively fast because of strong winds, the axial direction of the blade revolution shaft 21 is controlled to the direction parallel to the flow direction of the fluid, as shown in FIG. 20 or 22b, thereby allowing the pressure of the fluid applied to each blade 25 to be minimized to almost 0. Further, if only the direction of the blade revolution shaft 21 on the horizontal plane is adjusted to the left and right according to the flow velocity and direction of the fluid changing in real time, the rotational velocity and rotational force of the blade revolution shaft 21 as levels required can be obtained simply and economically.

Like this, the horizontal axis rotational force generator 1 having the principle as shown in FIG. 18 or FIGS. 22a and 22b has the following better advantages when compared with the conventional horizontal axis propellers, so that it can be applied in building an ultra-large wind generator on the land or in the ocean.

(a) As the areas of the blades to which a wind pressure is applied are very large, high energy production efficiency is obtained.
(b) The areas of the blades to which a wind pressure is applied are reduced to almost 0, preparing for strong winds.
(c) The rotational velocities of the blades are controlled only with the control of the axial direction of the blade revolution shaft.

(d) Since a foundation area is large and center of gravity is low, high structural stability is obtained.

(e) The flow velocity of the fluid is slow around the ground where the directions of the blades are opposite to the flow direction of the fluid, and the flow velocity of the fluid is fast as the blades move upward in the same direction as the flow direction of the fluid, so that high energy production efficiency is obtained. (f) if crank mechanism coupling bodies 426 and radial crank pin connection arms 428 are used, the lengths (the areas of the blades) of the blade revolution arms 22 can extend, while the number of rotational force transmission parts 42 and frictional energy loss are not being increased.

<Explanation of the Operating Principle Using Drawings>

(1) As shown in FIGS. 3a and 3b, 4a, 4b and 4c, 13, and 16, if pressure is applied to the blades 25, the blades 25 revolve around the blade revolution shaft 21, and in this case, since the blade revolution shaft support gear 41 is fixedly coupled to the blade revolution shaft support 33 and thus does not rotate, a driven spur gear 421 as the rotational force transmission part 42 of the revolution and rotation gear shifting interlocker 4, which is located between the blade revolution shaft support gear 41 and the blade rotation shaft gear 43, revolves and rotates around the blade revolution shaft support gear 41. The revolution angular velocities of the blade revolution arms 22 are shifted to angular velocities 0.5 times higher than the angular velocities of the blade revolution arms 22 in the opposite direction by means of various types of rotational force transmission parts 42 and transmitted to the blade rotation shaft gear 43, and accordingly, the blades 25 simultaneously rotate and revolve.

(2) As shown in FIGS. 3a and 3b, 13, and 16, the axial rotation of the blade revolution shaft 21 is transmitted to a generator rotating shaft gear 63 by means of a revolution force transmission part 62 as a driven spur gear engaging with the blade revolution shaft gear 61, so that electric power is produced from a generator 64.

(3) FIG. 2 shows the rotational force generator configured to have three blades 25 coupled to one blade revolution shaft 21 so that the rotational forces are transmitted through the chain belts 425, and in this case, structures and methods where the rotational forces are transmitted are differently made as shown in FIGS. 25a to 25d, which are adopted even in the horizontal axis rotational force generator 1 according to the present invention.

Figure 4A:
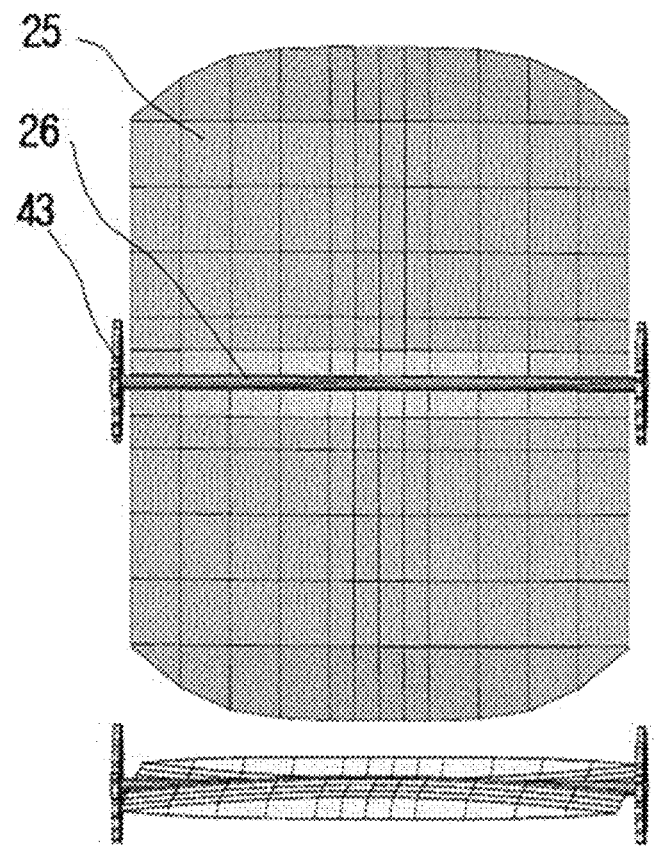
Figure 4B:
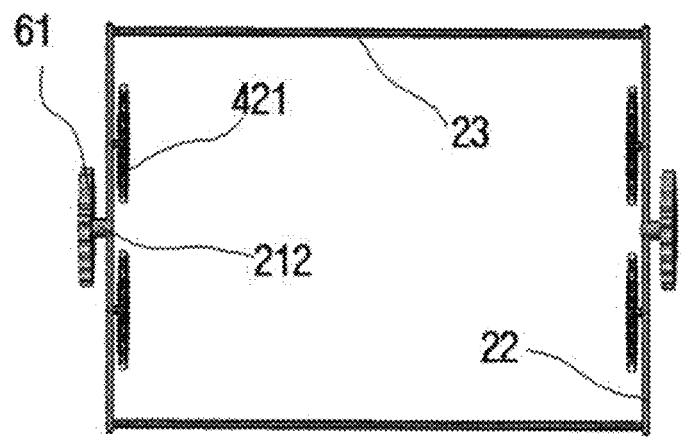
Figure 4C:
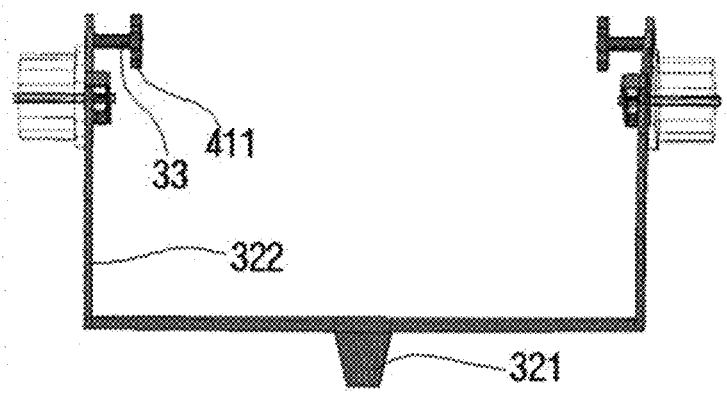
Figure 5:
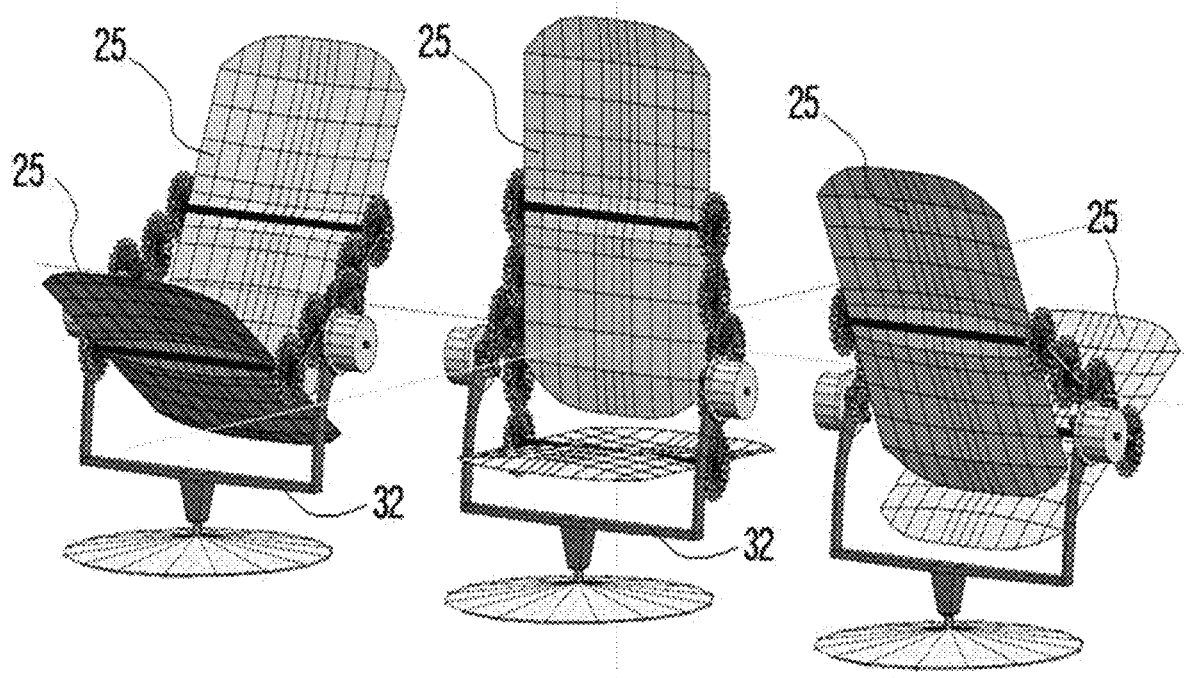
FIG. 5 is a perspective view showing three rotational force generators of FIGS. 3a and 3b in which a difference of revolution phase angles between the blades is 120°.

(4) As shown in FIG. 4b, an intermediate portion of the blade revolution shaft 21 is branched into two portions and thus bent, and accordingly, the branched portions of the blade revolution shaft 21 serve as the blade rotation shaft supports 23. Like this, the blade rotation shaft supports 23 do not perform axial rotation, as shown in FIG. 4a, a circular pipe type blade rotation shaft 26 fixedly coupled to the blade 25 surrounds the corresponding blade rotation shaft support 23 having the shape of a circular bar in such a way as to be rotatable relative to the blade rotation shaft support 23.

(5) If three blades 25 are coupled to one blade revolution shaft 21, as shown in FIGS. 12 and 18, the span of each blade 25 is only two times larger to the maximum than the revolution radius of the blade rotation shaft, but if two blades 25 are coupled to one blade revolution shaft 21, as shown in FIGS. 3a-3b and 4, the span of each blade 25 is $2*(2^{0.5})=2.8$ times larger to the maximum than the revolution radius of the blade rotation shaft, thereby receiving bigger hydraulic pressure.

(6) The embodiment of FIG. 7 is adopted when the flow direction of the fluid is constant on river, coast, valley, or space between high rise buildings. In this case, the blade revolution shaft rotating mechanisms 2 do not rotate to the left and right, and the blade revolution shaft supports 33 having the shape of the circular bar are fixedly coupled to the blade revolution shaft rotating mechanism rotating arms 32 so that they do not perform the axial rotation. Further, the blade revolution shaft support gear 41 having the shape of the bevel gear is fixedly coupled to the blade revolution shaft supports 33, and a short pipe type blade revolution shaft 212 surrounds the blade revolution shaft supports 33 in such a way as to be rotatable relative to the blade revolution shaft supports 33. Further, it is possible that the rotation phase angles according to the revolution phase angles of the blades 25 are set in the opposite direction to the direction as shown in FIG. 7.

Figure 10:
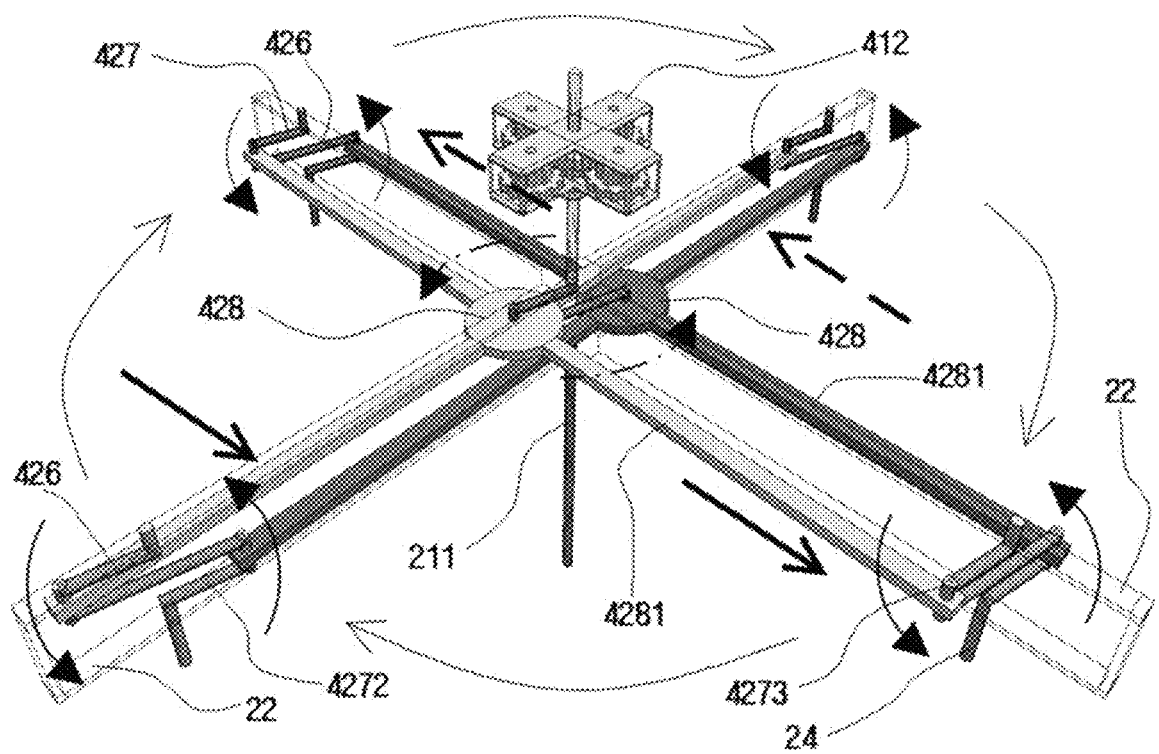
FIG. 10 is a perspective view showing a process of transmitting the rotational forces from the central blade revolution shaft to the four blade rotation shafts by means of two radial crank pin connection arms and five crank mechanisms that have point symmetry with one another and revolve around the blade revolution shaft in the embodiment of FIG. 8.

(7) FIG. 10 shows an operating mechanism of the revolution and rotation gear shifting interlocker 4 in which two+shaped radial crank pin connection arms 428 for allowing one blade revolution shaft crank mechanism 427 and four blade rotation shaft crank mechanisms 427 to interlock with one another revolve together at point symmetrical positions with each other around the blade revolution shaft 21, thereby transmitting rotational forces to the blade rotation shafts 24, without the generation of any eccentric loads. If the number of blade rotation shafts 24 is three like the horizontal axis rotational force generator 1 as shown in FIG. 18, each radial crank pin connection arm 428 has the shape of Y, and if the number of blade rotation shafts is two, each radial crank pin connection arm 42 has the shape of I. Accordingly, the blade revolution shaft 21 and the blade rotation shafts 24 rotate at the same angular velocity.

Figure 24:
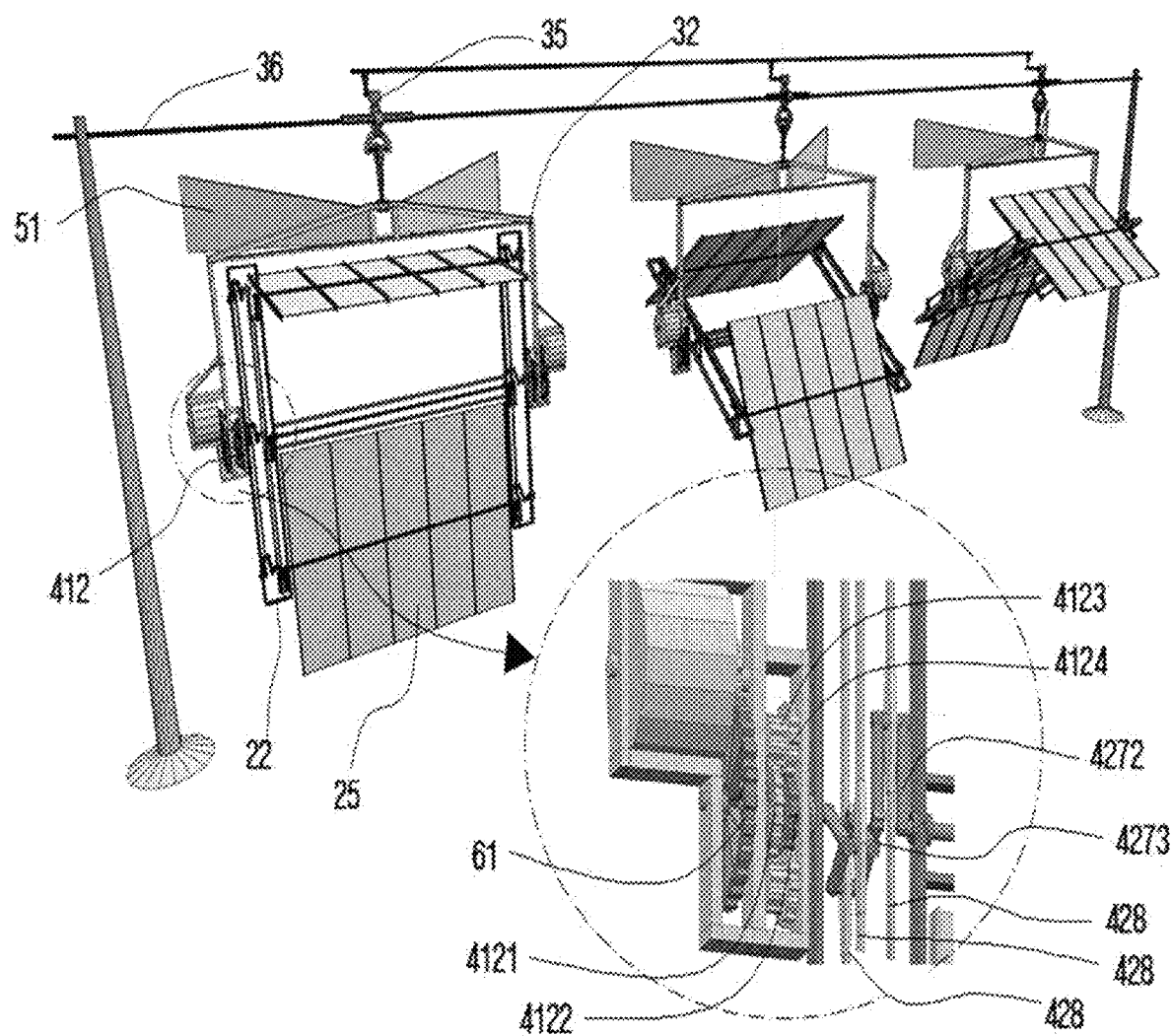
FIG. 24 is a perspective view showing a state wherein the rotational force generators each having three crank mechanisms and three radial crank pin connection arms located on the left and right sides of the blade revolution shaft hang on a long-distance cable extending horizontally.
Figure 25A:
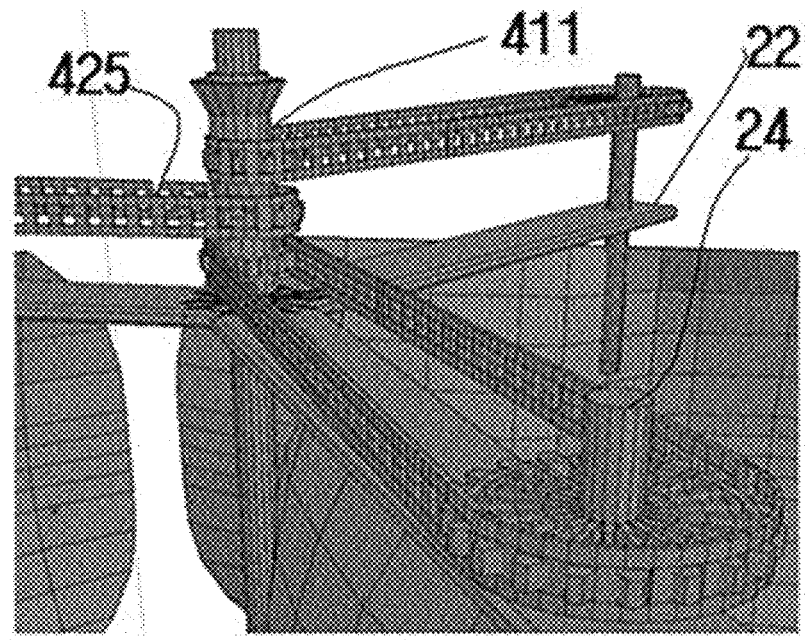
FIGS. 25a to 25d are perspective views showing various examples of shapes and operating principle of gears and chain belts transmitting the rotational forces between one blade revolution shaft and three blade rotation shafts.
Figure 25B:
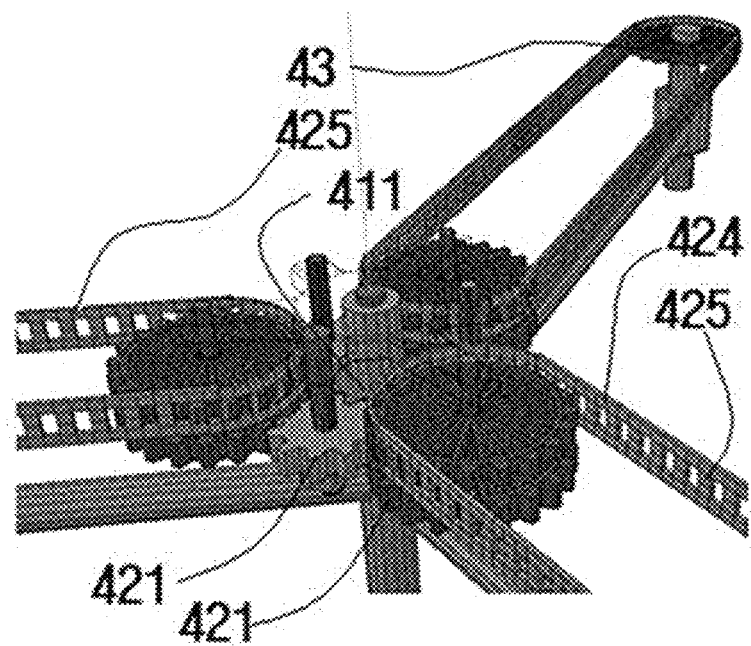
Figure 25C:
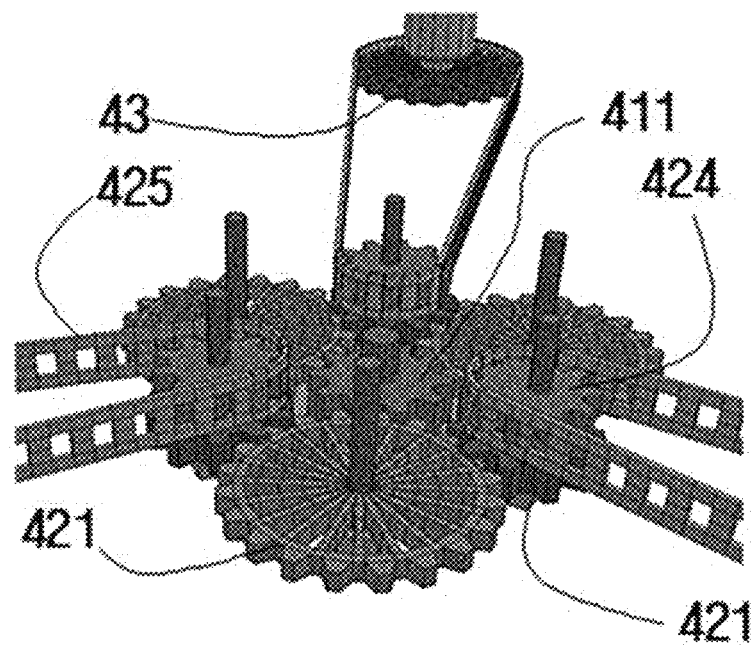
Figure 25D:
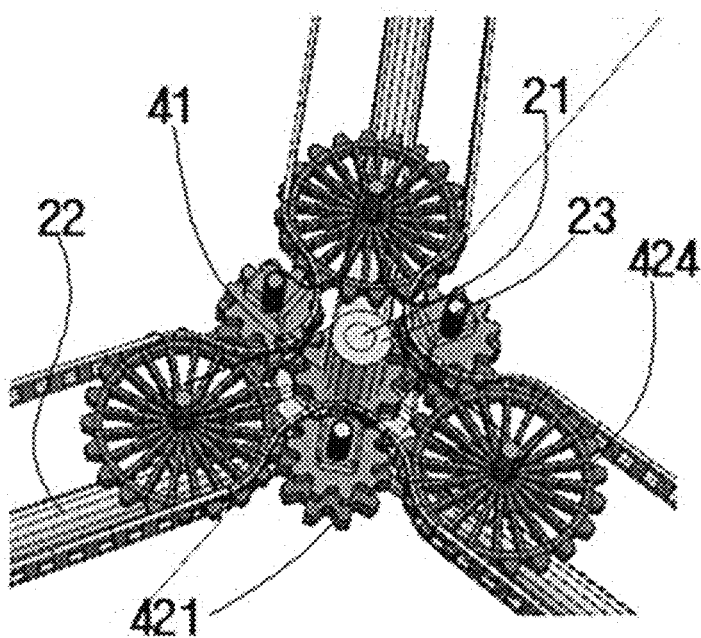

(8) As shown in FIG. 24, even in the case where two blade rotation shafts 24 interlock with one blade revolution shaft 21, three or more crank mechanisms 427 interlock with three or more I-shaped radial crank pin connection arms 428, and if so, the rotational force of the blade revolution shaft 21 is transmitted to the blade rotation shafts 24 only through the tensile resistance (whereas bending stress and compressive stress are ignored) produced from one of the three radial crank pin connection arms 428.

Figure 23A:
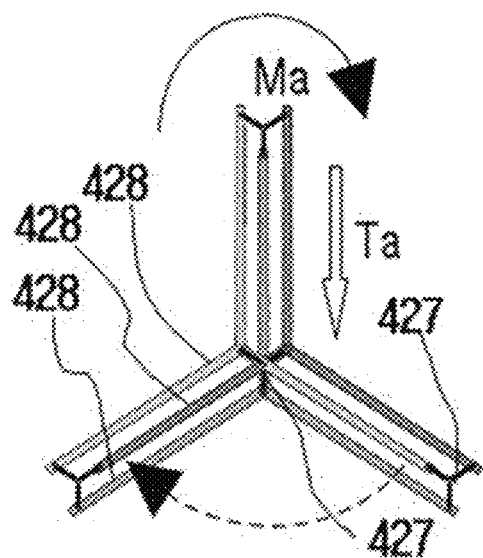
FIGS. 23a, 23b, 23c and 23d are concept views showing the principle and process in which the radial crank pin connection arms revolving around the blade revolution shaft transmit the rotational forces according to revolution phase angles through tension resistances in the horizontal axis rotational force generator of FIG. 18.
Figure 23B:
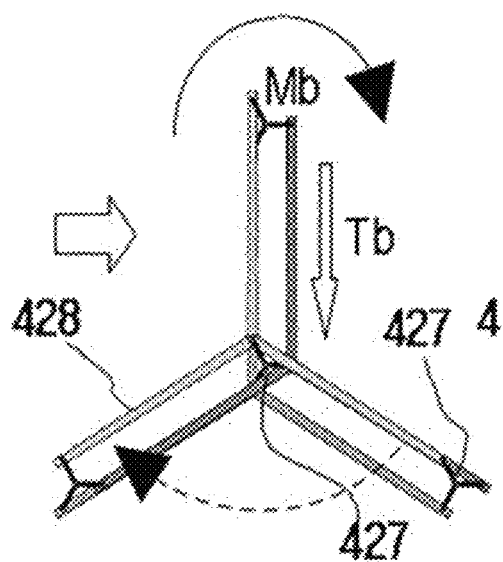
Figure 23C:
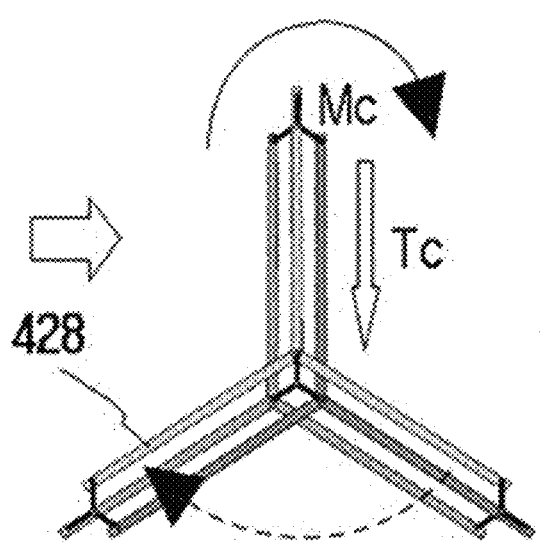
Figure 23D:
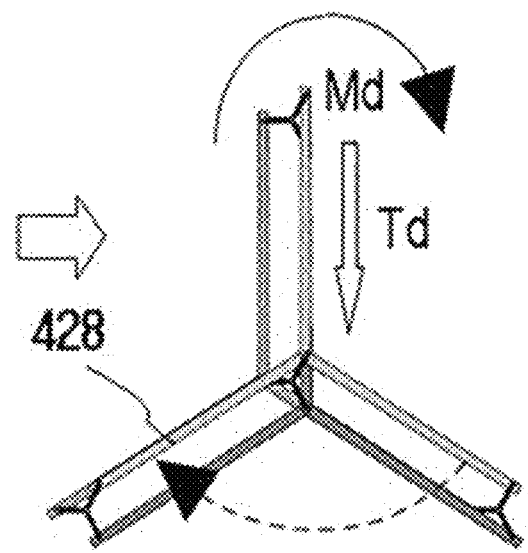

In detail, as shown in FIG. 23b, if it is assumed that the tensile stress produced from the vertical arm of the radial crank pin connection arms 428 is F, crank pin revolution radius is R, and the rotational force transmitted is M=F*R, the tensile stress in FIG. 23c where a crank pin 4273 rotates by 30° is $Fc=(3^{0.5})/2*F$, and in this case, the rotational force transmitted is $Mc=\{(3^{0.5})/2*F\}*\{(3^{0.5})/2*R\}=\frac{3}{4}*F*R=\frac{3}{4}*M$. Further, the tensile stress of one unit crank pin connection arm 4281 in FIG. 23d is $Fd=0.5*F$, and since tensile stress is produced from two arms, the rotational force transmitted is $Md=\{\frac{1}{2}*F*\frac{1}{2}*R\}=\frac{1}{2}*F*R=0.5*M$. Like this, the rotational force transmitted only through the tensile resistance of the tensile stress produced from the radial crank pin connection arms 428 periodically increases and decreases in the range of 0.5 to 1 times to the maximum according to the revolution phase angles by crank pins, and accordingly, if the long thin radial crank pin connection arms 428, which have high tensile strength and are made of a lightweight and easily bendable material (e.g., carbon fibers, engineering plastics, graphene, etc.), are provided, the profitability and efficiency in the transmission of the rotational forces can be enhanced.

Figure 11:
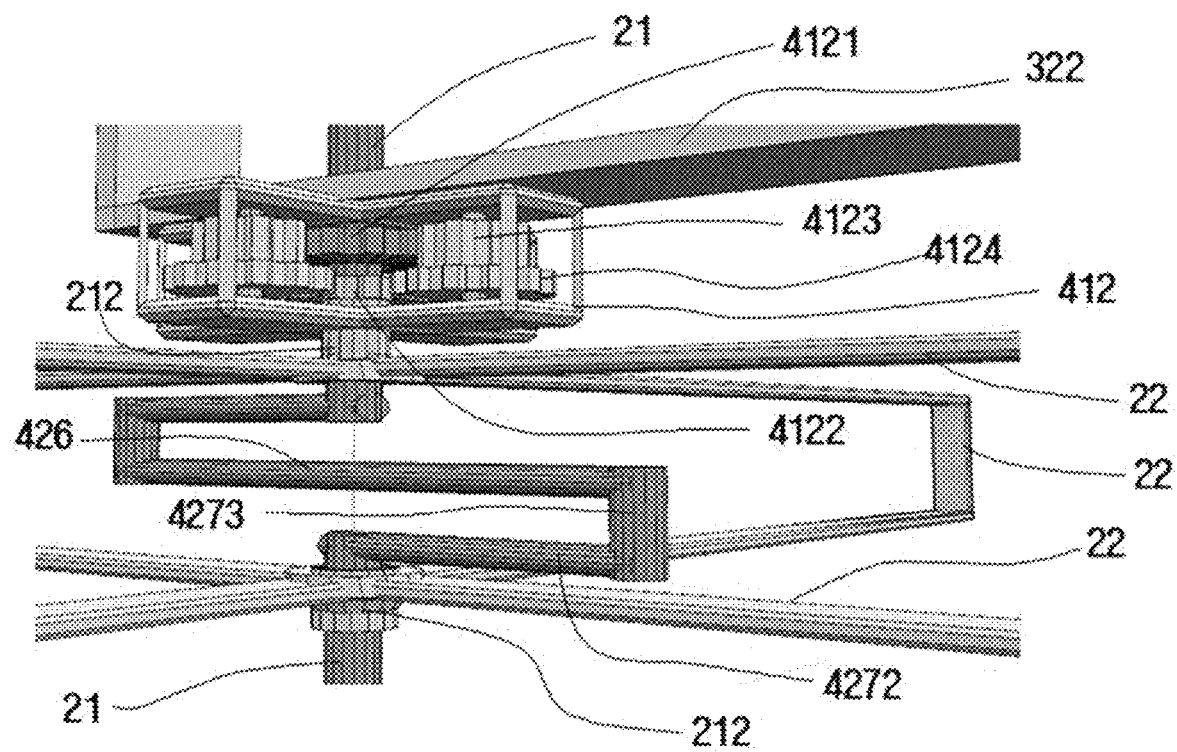
FIG. 11 is an enlarged perspective view showing the configuration and operating principle of a revolution shaft support planetary gear for shifting a rotational force so that the rotation angular velocity of the blade revolution shaft become 0.5 times higher than the revolution angular velocity of the blade in the embodiment of FIG. 8.

(9) FIG. 11 shows an operating mechanism of a revolution shaft support planetary gear 412 for reducing the revolution angular velocity of the blade 25 to ½ to transmit the reduced revolution angular velocity to the blade revolution shaft 21 and the blade rotation shafts 24. That is, the revolution shaft support planetary gear 412 is fixedly coupled to the blade revolution shaft rotating mechanism rotating arm 32, and the short pipe type blade revolution shaft 212 fixedly coupled to the blade revolution shaft rotating mechanism rotating arm surrounds the blade revolution shaft 21 in such a way as to be rotatable relative to the blade revolution shaft 21, so that if the blade 25 revolves, a revolution arm coupling sun gear 4122 fixed to the short pipe type blade revolution shaft 212 rotates in place, the revolution angular velocity of the blade 24 is reduced to the rotation in place angular velocity 0.5 times by means of the combination of a revolution arm interlocking planetary gear 4124 and a revolution shaft interlocking planetary gear 4123 coupled rotating in place to the revolution shaft support planetary gear 412. FIG. 11 shows eight planetary gears, and FIG. 24 shows four planetary gears.

(10) FIGS. 12 and 15 show the horizontal axis rotational force generators 1 each having the shape of a bird flapping its wing, while having a mechanical structure rotatable to the left and right, without having any interference with a vertical structure extending vertically, so that they are conveniently attached to a portion of the streetlight or utility pole in such a way as to rotatably surround the portion. As a result, they have the following advantages.

(a) If the horizontal axis rotational force generator according to the present invention is installed on a linear site such as a road, a railway, dike, and the like, it is easy to obtain an installation site economically.

(b) The horizontal axis rotational force generator according to the present invention has the shape of a bird flapping its wings, and accordingly, if the rotational force generator according to the present invention is installed on a road or park, good outer beauty is obtained.

(c) The generator or the like serves to balance weight on the front and back sides and the tail blade functions as a rudder.

(d) The energy efficiency in producing the rotational force from the horizontal axis rotational force generator according to the present invention is two times higher than that from the existing vertical axis wind turbine.

The bird-shaped horizontal axis rotational force generators are continuously installed along a center or side of a flat road, railway, dike, and the like, and the electricity generated from the rotational force generators is accumulated to a large-size battery (ESS) and thus utilized for various purposes for streetlights, electric vehicle charging, black ice melting, and the like.

Figure 21:
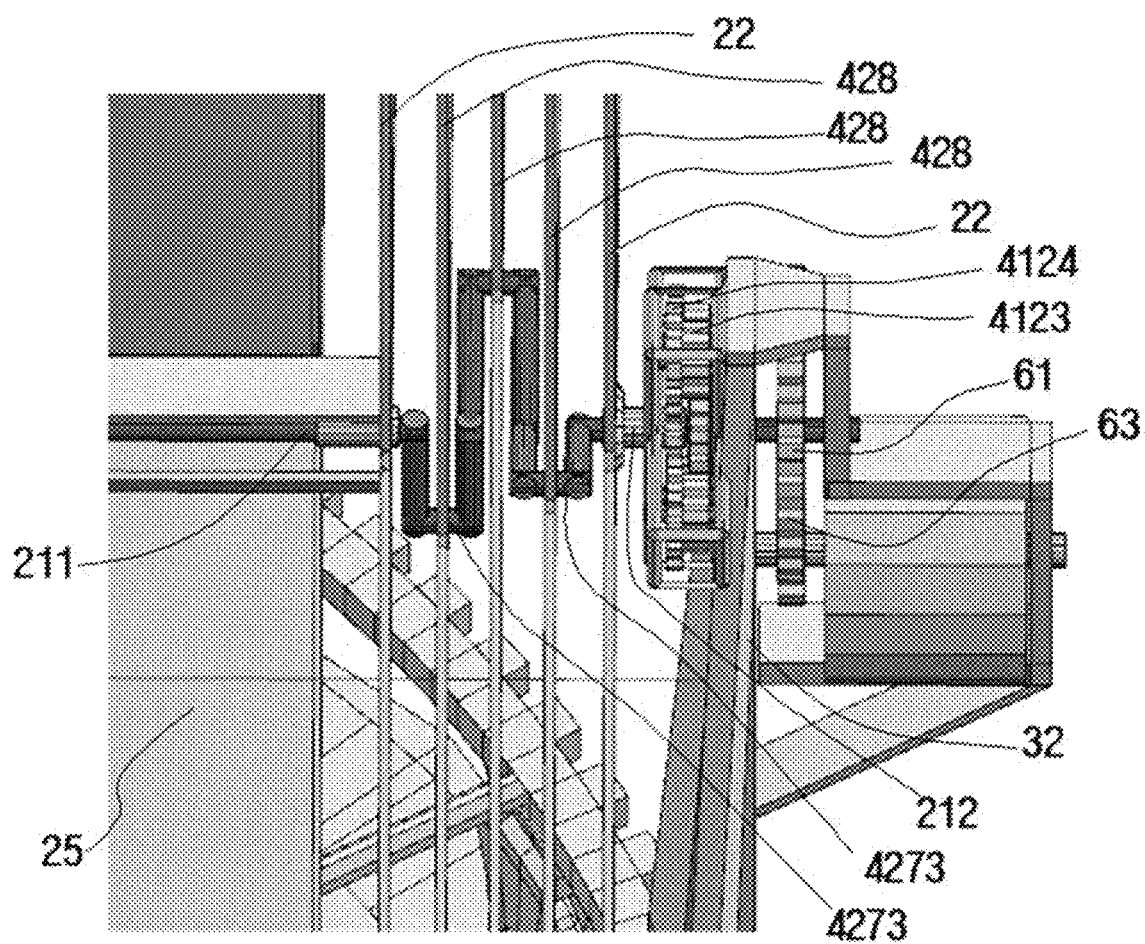
FIG. 21 is an enlarged perspective view showing three crank mechanisms and three radial crank pin connection arms constituting the revolution and rotation gear shifting interlocker of the horizontal axis rotational force generator of FIG. 18.

(11) The ultra-large wind generator as shown in FIG. 18 is configured to allow a blade revolution shaft rotating mechanism rotating shaft rotating gear 54 to rotate slowly by means of the low-output direction control power device 52 interlocking with the flow velocity and direction sensing device 53, so that only if only directions toward which the surfaces of the blades are oriented are appropriately changed, the rotational velocities of the blades 25 are simply controlled and the structural stability with respect to wind pressure is easily ensured. Further, FIG. 21 shows three crank pins 4273 and three radial crank pin connection arms 428 coupled to the blade revolution shaft 21 in such a way as to have a phase angle difference of 120° to one another.

Further, as shown in FIGS. 22*a* and 22*b*, if the installation directions of the wind vane rudders 51 are appropriately changed according to the flow velocity of the fluid, it is possible to perform the left and right direction control of the wind generator corresponding to the flow direction of the fluid, the rotational velocity control of the blades, and the minimalization of the wind pressure caused by strong winds applied to the blades. In this case, if two wind vane rudders 51 are located perpendicular to the blade revolution shaft 21, as shown in FIG. 22*a*, the pressure of the fluid applied to the blades 25 and the rotational forces produced are maximized, and contrarily, if one wind vane rudder 51 is located in the same direction as the blade revolution shaft 21, as shown in FIG. 22*b*, the pressure of the fluid applied to the blades 25 is minimized. Such an ultra-large rotational force generator is applicable to a swing ride that rotates with the wind.

Figure 26A:
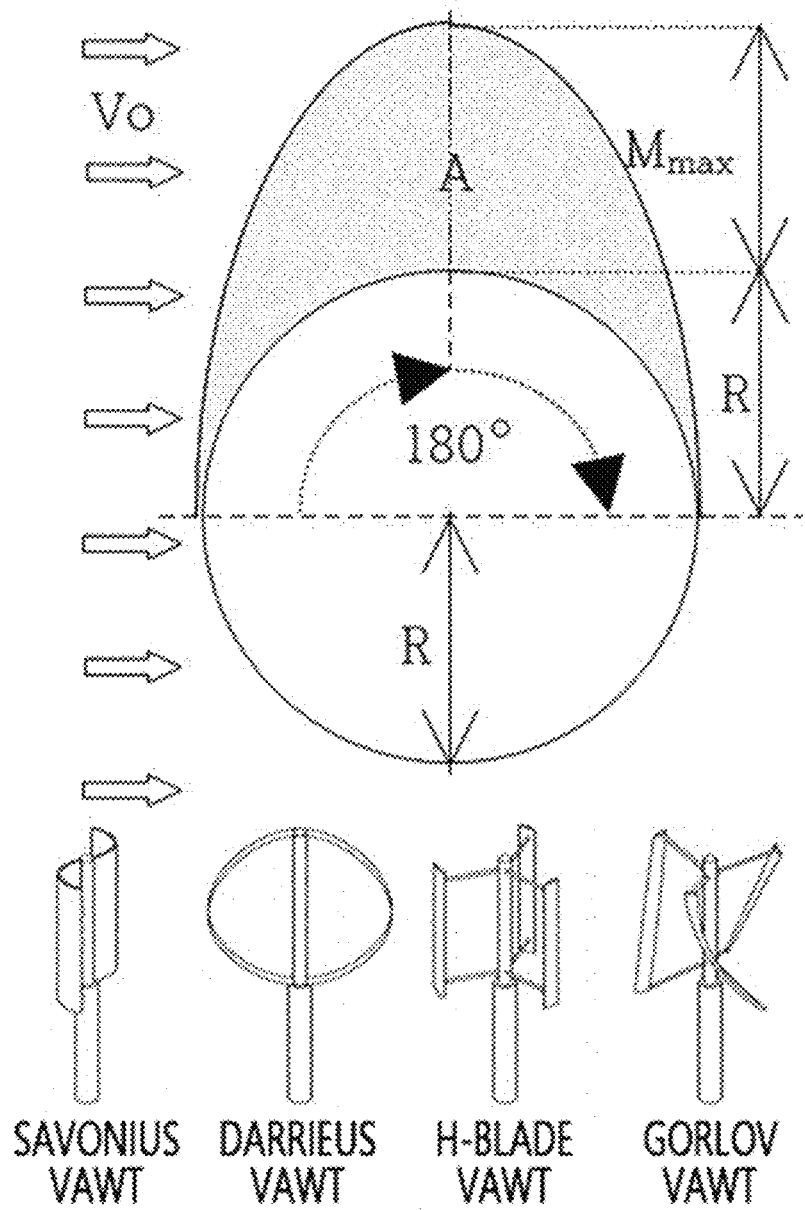
FIG. 26a is a schematic view showing areas representing amounts of rotational force produced according to revolution phase angles of the existing vertical axis rotational force generator such as the Darrieus wind generator.
Figure 26B:
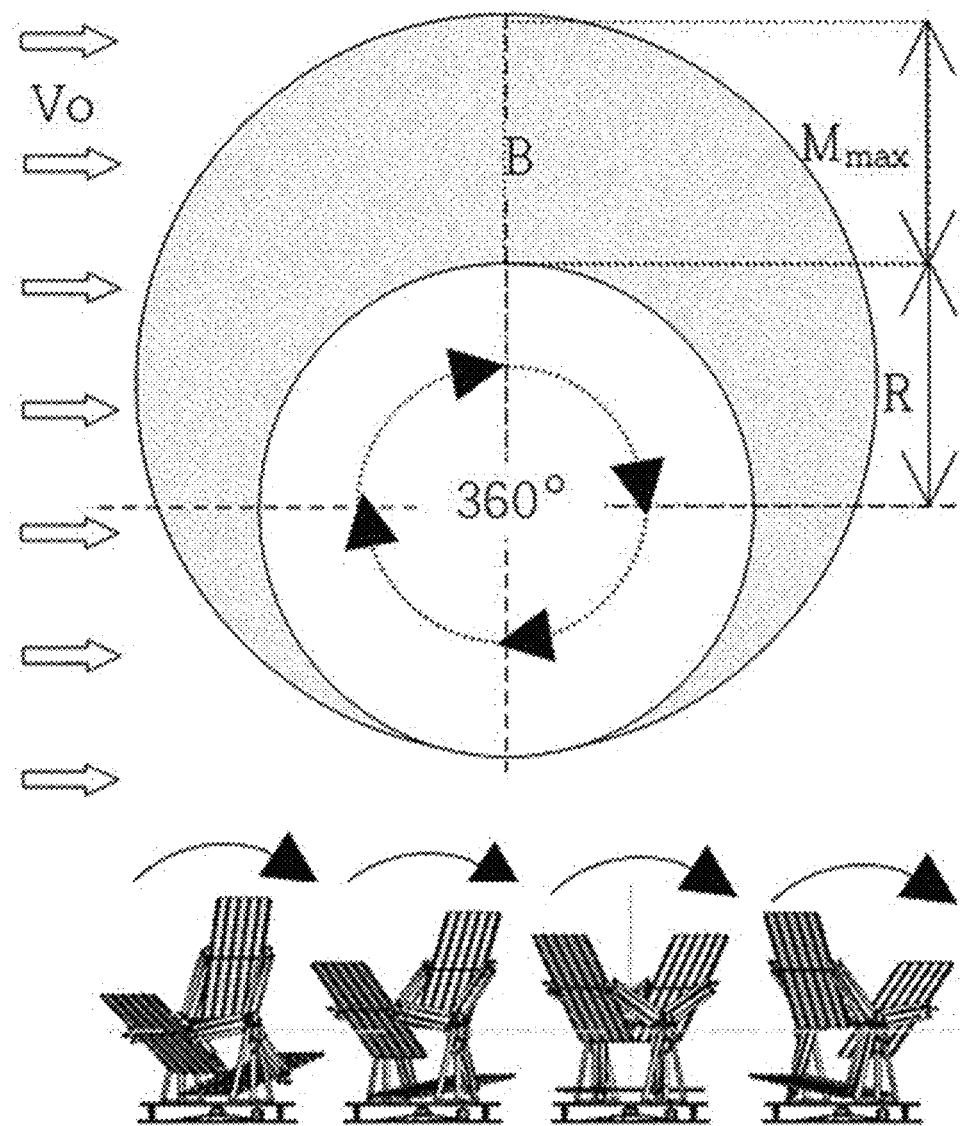
FIG. 26b is a schematic view showing areas representing amounts of rotational force produced according to revolution phase angles of the horizontal axis rotational force generator according to the present invention.

(12) The horizontal axis rotational force generator 1 according to the present invention produces the rotational force two times larger than the existing vertical axis rotational force generator, which will be intuitively explained with reference to FIGS. 26*a*-26*b* showing rotational force production. Further, the existing propeller type horizontal axis rotational force generator is configured to allow the direction of the blade rotation shaft to be parallel to the flow of the fluid, but the horizontal axis rotational force generator 1 according to the present invention is configured to allow the direction of the blade rotation shaft to be perpendicular to the flow of the fluid, which causes a difference in the operating principle from the existing generator. In the case of a small wind generator, of course, the vertical axis rotational force generator has energy efficiency in the production of rotational force higher than the existing propeller type horizontal axis rotational force generator. Further, the following results are obtained through the comparison between the horizontal axis rotational force generator 1 according to the present invention and the existing vertical axis rotational force generator.

First, it is assumed that the revolution radius of the blade 25 is R and the span of the blade 25 is 1, and next, if the rotational force sizes according to the revolution phase angles of the blade 25 are continuously connected, the existing vertical axis wind generator has the shape of a gray portion as shown in FIG. 26*a*, whereas the horizontal axis rotational force generator 1 according to the present invention has the shape of a gray portion as shown in FIG. 26*b*. If a difference between the areas of the gray portions is calculated, accordingly, the difference is almost similar to the sum of the rotational forces produced while the blade is rotating by 360° one time.

(a) If it is assumed that the area of the gray portion as shown in FIG. 26*a* is A and the area of the gray portion as shown in FIG. 26*b* is B, $$A = \pi * \{(2R)*(2R)*(1/2) - (R*R)\} * (1/2) = 0.5 * \pi * R * R$$
$$B = \pi * \{(1.5R)*(1.5R) - (R*R)\} = 1.25 * \pi * R * R$$

(b) Therefore, B/A as the rate of the sum of rotational forces produced during one time rotation of the blade is 1.25/0.5=2.5

Figure 6:
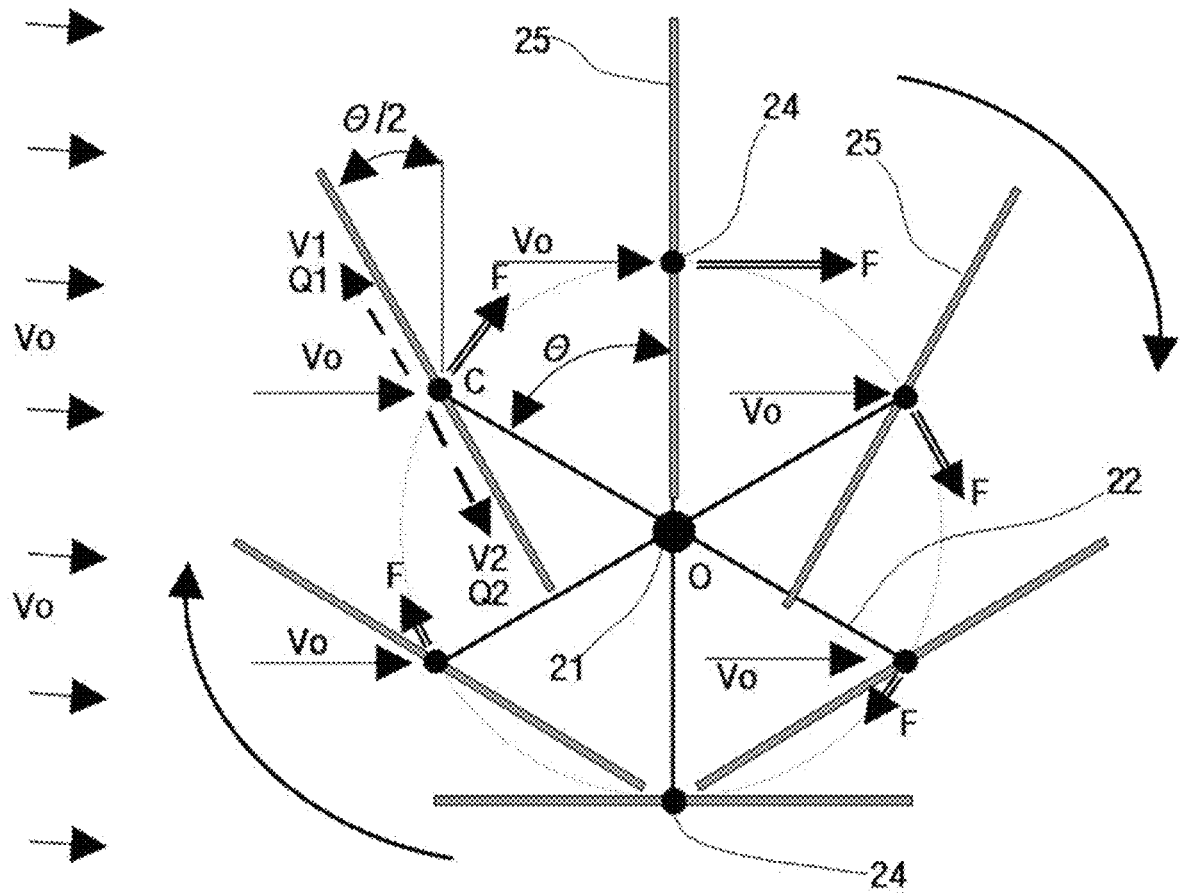
FIG. 6 is a concept view showing the dynamic relation between the revolution and rotation phase angles of the blades and the torque generated on the blade revolution shaft in the embodiment of FIGS. 3a and 3b.

Even if a backward rotational force is not produced at all in the section from 90° to 270° in the existing vertical axis rotational force generator, accordingly, it can be intuitively understood that the rotational force produced from the horizontal axis rotational force generator 1 according to the present invention is at least two times larger than the existing vertical axis rotational force generator such as the Darrieus wind turbine, the Savonius wind turbine, and the like. Further, it can be checked that the horizontal axis rotational force generator 1 according to the present invention is two times larger than the patent literature 5 entitled "Rotational force generator revolving and rotating according to flow of fluid" as filed by the same applicant as the present invention through the hydrodynamical calculation as shown in FIG. 6.

The present invention may be modified in various ways and may have several exemplary embodiments. However, this does not limit the invention within specific embodiments and it should be understood that the invention covers all the modifications, equivalents, and replacements within the scope of the claims of the invention. The present invention may be applied to various industrial fields where a rotational force is produced using the flow of a fluid, such as wind power generation, water power generation, tidal power generation, swing rides, and the like.

INDUSTRIAL APPLICABILITY

The present invention may be applied to various industrial fields where a rotational force is produced using the flow of a fluid, such as windmills, water wheels, wind power generation, water power generation, tidal power generation, swing rides, and the like.

The invention claimed is:

1. A horizontal axis rotational force generator using a flow of a fluid, comprising:
one or more blade revolution shaft rotating mechanisms, each having two or more blades spaced apart at same revolution phase angle intervals to revolve around a blade revolution shaft extending horizontally and simultaneously rotate around a blade rotation shaft parallel to the blade revolution shaft, such that, when a pressure is applied from the flow of the fluid thereto, rotational force is applied to the blade revolution shaft;
a blade revolution shaft rotating mechanism support structure configured to axially rotate the blade revolution shaft and rotate the one or more blade revolution shaft rotating mechanisms to the left and right; and
a revolution and rotation gear shifting interlocker adapted to interlock a revolution phase angle and a rotation phase angle of each blade to maximize the rotational force provided from each blade to the blade revolution shaft,
wherein each blade revolution shaft rotating mechanism comprises:
the blade revolution shaft extending horizontally;
two or more blade revolution arms extending radially from a center of the blade revolution shaft at the same revolution phase angle intervals;
blade rotation shaft supports located on end portions of the two or more blade revolution arms;
the blade rotation shaft coupled to the blade rotation shaft supports in a direction parallel to the blade revolution shaft; and
the two or more blades, each having two curved bodies coupled to each other in line symmetry around the corresponding blade rotation shaft, wherein revolution angular velocities of the blade revolution arms are shifted and transmitted to the blade rotation shaft by the revolution and rotation gear shifting interlocker so that the blade rotation shaft rotate in place at angular velocities 0.5 times higher than the blade revolution arms in an opposite rotational direction to the blade revolution arms,
wherein the blade revolution shaft rotating mechanism support structure comprises:
a blade revolution shaft rotating mechanism rotating shaft extending vertically and configured to rotate the blade revolution shaft rotating mechanisms to the left and right along moving trajectories on a horizontal plane;
a blade revolution shaft rotating mechanism rotating shaft stand fixed at a position to support the blade revolution shaft rotating mechanism rotating shaft;
one or more blade revolution shaft rotating mechanism rotating arms rotatably coupled to the blade revolution shaft rotating mechanism rotating shaft and extending toward the blade revolution shaft; and
one or more blade revolution shaft supports located on each blade revolution shaft rotating mechanism rotating arm and coupled to a blade revolution shaft support gear protruding therefrom toward an axial direction of the blade revolution shaft, wherein the revolution and rotation gear shifting interlocker includes the blade revolution shaft support gear,
wherein the revolution and rotation gear shifting interlocker determines a relation between the revolution phase angle and the rotation phase angle of each blade with respect to the axial direction of the vertically extending blade revolution shaft rotating mechanism rotating shaft, so that when the blade rotation shaft revolving around the blade revolution shaft passes vertically above the blade revolution shaft, a surface of each blade is oriented in a horizontal or a vertical direction, and
wherein, when the flow velocities and directions of the fluid are changed and no additional power is provided, the blade revolution shaft rotating mechanism rotating shaft provides a reference direction for determining the rotation phase angle on a vertical plane, such that each blade has the rotation phase angle on the vertical plane, at which the blade revolution shaft produces the maximum rotational force according to the revolution phase angle.

2. The horizontal axis rotational force generator according to claim 1, wherein each blade revolution shaft rotating mechanism rotating arm has a horizontal length greater than 0 m, such that when a flow direction of the fluid is changed and no additional power is provided, each blade revolution shaft rotating mechanism is pushed by the flow of the fluid and rotates to the left and right around the blade revolution shaft rotating mechanism rotating shaft, wherein the blade revolution shaft extends in the horizontal direction perpendicular to the flow direction of the fluid, and each blade has a blade revolution shaft rotating mechanism rotational direction angle on the horizontal plane, at which the blade revolution shaft produces the maximum rotational force using the flow of the fluid.

3. The horizontal axis rotational force generator according to claim 1, further comprising a wind vane rudder or direction control power device rotatably disposed on the horizontal plane between the blade revolution shaft rotating mechanisms and the blade revolution shaft rotating mechanism rotating shaft stand, the wind vane rudder or direction control power device being configured to apply an external force breaking the balance of the pressure of the fluid applied to left and right portions of the blade revolution shaft rotating mechanisms in any direction to change the rotational direction angle of each blade revolution shaft rotating mechanism on the horizontal plane, such that the pressure caused by the flow of the fluid applied vertically to the surfaces of the blades is adjusted without consuming power beyond a threshold, thereby controlling the rotational velocity and the rotational force of each blade to a predetermined level.

4. The horizontal axis rotational force generator according to claim 1, wherein, when the flow velocity of the fluid increases beyond a predetermined range due to winds or floods, the axial direction of the blade revolution shaft is aligned parallel to the flow direction of the fluid to reduce a resultant force and an area of the pressure in the flow direction of the fluid applied to the blades.

5. The horizontal axis rotational force generator according to claim 1, wherein the horizontal axis rotational force generator is rotatably mounted on an upper portion of a vertical support structure.

6. The horizontal axis rotational force generator according to claim 1, wherein the blade revolution shaft rotating mechanism rotating shaft extends in a vertical downward direction by self-weight thereof, and wherein the horizontal axis rotational force generator is spaced apart another horizontal axis rotational force generator in a line on a horizontal linear structure extending horizontally, the horizontal linear structure including a cable.

7. The horizontal axis rotational force generator according to claim 1, wherein the blade revolution shaft rotating mechanisms are coupled to one another and continuously installed in a horizontal or vertical direction by the of blade revolution shaft rotating mechanism support structure.

8. The horizontal axis rotational force generator according to claim 1, wherein the revolution and rotation gear shifting interlocker includes spur gears, bevel gears, chain belts, or crank mechanisms as rotational force transmission parts engaging with the blade revolution shaft support gear.

9. The horizontal axis rotational force generator according to claim 1, wherein three or more crank mechanisms are located on the end portions of the blade revolution shaft and the blade rotation shafts of each blade revolution shaft rotating mechanism, the three or more crank mechanisms being spaced apart from one another at the same revolution phase angle intervals and coupled to the blade revolution and rotation shafts, and blade revolution shaft crank pins and blade rotation shaft crank pins having the same revolution phase angle intervals are rotatably connected to one another by radial crank pin connection arms radially extending from a center of a central blade revolution shaft crank pin toward the respective blade rotation shaft crank pins to interlock with one another and revolve around the respective blade revolution and rotation shafts at the same revolution phase angle intervals and angular velocity, wherein when three or more crank pins located on the blade revolution shaft revolve are paced apart from one another at the same revolution phase angle intervals, the radial crank pin connection arms hinge-coupled to the respective crank pins of the blade revolution shaft revolve at the same revolution phase angle intervals, and wherein at least one of the radial crank pin connection arms of each blade revolution shaft transmits the rotational force of the blade revolution shaft to one blade rotation shaft through tensile resistance generated from a material of the at least one of radial crank pin connection arms, and the rotational force transmitted through the tensile resistance periodically increases and decreases in a range of 0.5 to 1 times according to the revolution phase angles of the crank pins.

* * * * *